US010705879B2

(12) United States Patent
Oshins

(10) Patent No.: US 10,705,879 B2
(45) Date of Patent: *Jul. 7, 2020

(54) ADJUSTING GUEST MEMORY ALLOCATION IN VIRTUAL NON-UNIFORM MEMORY ARCHITECTURE (NUMA) NODES OF A VIRTUAL MACHINE

(71) Applicant: Microsoft Technology Licensing, LLC, Redmond, WA (US)

(72) Inventor: Jacob Oshins, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/355,754

(22) Filed: Nov. 18, 2016

(65) Prior Publication Data
US 2017/0068562 A1 Mar. 9, 2017

Related U.S. Application Data

(63) Continuation of application No. 12/412,272, filed on Mar. 26, 2009, now Pat. No. 9,529,636.

(51) Int. Cl.
G06F 9/50 (2006.01)
G06F 9/455 (2018.01)
G06F 12/02 (2006.01)

(52) U.S. Cl.
CPC ............ *G06F 9/5077* (2013.01); *G06F 9/455* (2013.01); *G06F 9/45558* (2013.01); *G06F 9/5016* (2013.01); *G06F 9/5088* (2013.01); *G06F 12/0284* (2013.01); *G06F 2009/4557* (2013.01);

(Continued)

(58) Field of Classification Search
CPC .. G06F 9/455; G06F 9/45533; G06F 9/45558; G06F 9/50; G06F 9/5016; G06F 9/5077; G06F 9/5088; G06F 2009/4557
See application file for complete search history.

(56) References Cited

U.S. PATENT DOCUMENTS

| 5,283,730 A | 2/1994 | Ito |
| 6,075,938 A | 6/2000 | Bugnion et al. |
| 6,336,170 B1 | 1/2002 | Dean et al. |

(Continued)

FOREIGN PATENT DOCUMENTS

| CN | 101158927 A | 4/2008 |
| CN | 101271401 A | 9/2008 |

(Continued)

OTHER PUBLICATIONS

"Virtualization: State of the Art, Scope Alliance", Retrieved from<<http://www.profsandhu.com/cs6393_s14/SCOPE-Virtualization-StateofTheArt-Version-1.0.pdf>>, Apr. 3, 2008, pp. 1-18.

(Continued)

*Primary Examiner* — David J. Huisman
(74) *Attorney, Agent, or Firm* — BakerHostetler

(57) ABSTRACT

Techniques for effectuating a virtual Non-Uniform Memory Architecture (NUMA) for virtual machines and adjusting memory in virtual NUMA nodes are described. The virtual NUMA node topology may include a plurality of virtual NUMA nodes. The memory may be adjusted based on pressure in a specific virtual NUMA node of the plurality and an amount of guest memory assigned to the specific virtual NUMA node.

20 Claims, 17 Drawing Sheets

(52) U.S. Cl.
CPC .............. *G06F 2009/45583* (2013.01); *G06F 2212/1041* (2013.01)

(56) References Cited

U.S. PATENT DOCUMENTS

| | | | |
|---|---|---|---|
| 7,231,504 B2 | 6/2007 | Kashyap et al. | |
| 7,290,259 B2 | 10/2007 | Tanaka et al. | |
| 7,299,337 B2 | 11/2007 | Traut et al. | |
| 7,334,076 B2 | 2/2008 | Hendel et al. | |
| 7,433,951 B1 | 10/2008 | Waldspurger | |
| 7,434,002 B1 | 10/2008 | Zedlewski et al. | |
| 7,451,459 B2 | 11/2008 | Glass et al. | |
| 7,596,654 B1 | 9/2009 | Wong | |
| 7,945,913 B2 | 5/2011 | Kashyap | |
| 8,195,866 B2 | 6/2012 | Ginzton | |
| 8,776,050 B2 * | 7/2014 | Plouffe ............... | G06F 9/45537 718/1 |
| 9,529,636 B2 * | 12/2016 | Oshins ................ | G06F 12/0284 |
| 9,535,767 B2 | 1/2017 | Oshins | |
| 2002/0144185 A1 | 10/2002 | Farago et al. | |
| 2002/0152371 A1 | 10/2002 | Lee et al. | |
| 2003/0009641 A1 | 1/2003 | Arimilli et al. | |
| 2003/0037092 A1 | 2/2003 | McCarthy et al. | |
| 2003/0088608 A1 | 5/2003 | McDonald | |
| 2004/0015366 A1 | 1/2004 | Wiseman et al. | |
| 2004/0205304 A1 | 10/2004 | McKenney et al. | |
| 2005/0059310 A1 | 3/2005 | Ricking et al. | |
| 2005/0120160 A1 | 6/2005 | Plouffe et al. | |
| 2005/0132362 A1 | 6/2005 | Knauerhase et al. | |
| 2005/0262505 A1 | 11/2005 | Esfahany et al. | |
| 2006/0136653 A1 | 6/2006 | Traut et al. | |
| 2006/0184938 A1 | 8/2006 | Mangold | |
| 2006/0206891 A1 | 9/2006 | Armstrong et al. | |
| 2007/0067604 A1 | 3/2007 | Elnozahy et al. | |
| 2007/0100845 A1 | 5/2007 | Sattler et al. | |
| 2007/0198243 A1 | 8/2007 | Leis et al. | |
| 2007/0250784 A1 | 10/2007 | Riley et al. | |
| 2008/0022032 A1 | 1/2008 | Nicholas et al. | |
| 2008/0028179 A1 | 1/2008 | Mannarswamy et al. | |
| 2008/0071642 A1 | 3/2008 | Leiba | |
| 2008/0155168 A1 | 6/2008 | Sheu et al. | |
| 2009/0307686 A1 | 12/2009 | Hepkin | |
| 2009/0313445 A1 | 12/2009 | Pandey et al. | |
| 2010/0223622 A1 | 9/2010 | Anand et al. | |
| 2010/0250868 A1 | 9/2010 | Oshins | |
| 2010/0251234 A1 | 9/2010 | Oshins | |
| 2017/0075617 A1 | 3/2017 | Oshins | |

FOREIGN PATENT DOCUMENTS

| | | | |
|---|---|---|---|
| JP | 2006178933 A | 7/2006 | |
| JP | 2007257097 A | 10/2007 | |
| KR | 1020060071307 A | 6/2006 | |
| RU | 2003123112 A | 2/2005 | |
| RU | 47116 U1 | 8/2005 | |
| RU | 2006103559 A | 8/2007 | |

OTHER PUBLICATIONS

"Oral Hearing Issued in European Patent Application No. 10756649.9", dated Mar. 8, 2017, 12 Pages.
"Supplementary Search Report Issued in European Patent Application No. 10756651.5", dated Jan. 7, 2013, 7 Pages.
"Supplementary Search Report Issued in European Patent Application No. 10756649.9", dated Aug. 22, 2014, 7 Pages.
"Final Office Action Issued in U.S. Appl. No. 12/412,272", dated Feb. 9, 2015, 18 Pages.
"Non Final Office Action Issued in U.S. Appl. No. 12/412,258", dated Apr. 14, 2016, 18 Pages.
"Notice of Allowance Issued in U.S. Appl. No. 12/412,258", dated Aug. 23, 2016, 9 Pages.
"Office Action Issued in Canadian Patent Application No. 2,753,229", dated Jun. 1, 2016, 3 Pages.

"First Office Action Issued in Chinese Patent Application No. 201080013779.0", dated Aug. 23, 2012, 8 Pages.
"Notice of Allowance Issued in Chinese Patent Application No. 201080013779.0", dated Aug. 9, 2013, 3 Pages.
"Notice of Allowance Issued in Chinese Patent Application No. 201080013782.2", dated Feb. 6, 2013, 4 Pages.
"Office Action Issued in Chinese Patent Application No. 201080013782.2", dated Sep. 12, 2012, 9 Pages.
Chapman, et al., "Implementing Transparent Shared Memory on Clusters Using Virtual Machines", In Proceedings of the Annual Technical Conference on USENIX, Apr. 10, 2005, 9 Pages.
Govil, et al., "Cellular Disco: Resource Management Using Virtual Clusters on Shared-Memory Multiprocessors", In Proceedings of the 17th ACM Symposium on Operating Systems Principles, Dec. 12, 1999, pp. 154-169.
Gummaraju, et al., "Virtual Machines", In Lecture #10, EE392C: Advanced Topics in Computer Architecture, May 1, 2003, pp. 1-5.
Kaneda, et al., "A Virtual Machine Monitor for Utilizing Non-Dedicated Clusters", In Proceedings of the twentieth ACM Symposium on Operating Systems Principles, Oct. 23, 2005, 2 Pages.
"International Search Report and Written Opinion Issued in PCT Application No. PCT/US2010/28038", dated Nov. 1, 2010, 8 Pages.
"International Search Report and Written Opinion Issued in PCT Application No. PCT/US2010/28034", dated Oct. 29, 2010, 8 Pages.
Russinovich, Mark, "Inside Windows Server 2008 Kernel Changes", Retrieved from<<https://technet.microsoft.com/en-us/library/cc194386.aspx>>, Mar. 2008, pp. 1-6.
Verghese, et al., "OS Support for Improving Data Locality on CC-NUMA Compute Servers", In Technical Report: CSL-TR-96-688, Feb. 1996, 35 Pages.
Whitaker, et al., "Rethinking the Design of Virtual Machine Monitors", In Computer, vol. 38, Issue 5, May 16, 2005, 6 Pages.
"Office Action Issued in Korean Application No. 10-2011-7022331", dated Dec. 18, 2015, 4 Pages.
"Office Action Issued in Korean Patent Application No. 10-2011-7022331", dated Jun. 29, 2016, 8 Pages.
"Office Action Issued in European Patent Application No. 10756651.5", dated Jan. 24, 2018, 12 Pages.
"Non Final Office Action Issued in U.S. Appl. No. 15/359,561", dated Sep. 12, 2018, 20 Pages.
"Second Office Action Issued in Chinese Patent Application No. 201080013779.0", dated Jan. 29, 2013, 4 Pages.
"Office Action Issued in Russian Patent Application No. 2011139102", dated Nov. 21, 2014, 5 Pages.
"Office Action Issued in Canadian Patent Application No. 2753229", dated Nov. 6, 2017, 3 Pages.
"Office Action Issued in Indian Patent Application No. 6934/CHENP/2011", dated Dec. 26, 2018, 6 Pages.
"Office Action Issued in Indian Patent Application No. 06935/CHENP/2011", dated Jul. 17, 2019, 6 Pages.
"Office Action Issued in European Patent Application No. 10756651.5", dated Oct. 7, 2019, 19 Pages.
"Resource Management Guide", Retrieved from: https://web.archive.org/web/20151019090238/http://www.aberdeeninc.com/abcatg/docs-vmware/vi3_35_25_u2_resource_mgmt.pdf, Retrieved Date: Oct. 19, 2015, 212 Pages, Relevant pp. 143,158 , & 164-167.
"Office Action Issued in European Patent Application No. 10756651.5", dated Sep. 13, 2019, 08 Pages.
"Office Action issued in Brazil Patent Application No. PI1009277-3", dated Aug. 9, 2019, 5 Pages.
"Oral Hearing Issued in European Patent Application No. 10756651.5", dated Mar. 25, 2019, 3 Pages.
"Summons to attend Oral Proceedings Issued in European Patent Application No. 10756651.5", dated Feb. 28, 2019, 16 Pages.
"Office Action Issued in Korean Patent Application No. 10-2011-7022356", dated Dec. 18, 2015, 6 Pages.
"Office Action Issued in European Patent Application No. 10756649.9", dated Jun. 22, 2016, 5 Pages.
"Final Office Action Issued in U.S. Appl. No. 12/412,258", dated Feb. 16, 2012, 16 Pages.
"Non-Final Office Action Issued in U.S. Appl. No. 12/412,258", dated Jul. 25, 2014, 17 Pages.

(56) References Cited

OTHER PUBLICATIONS

"Non-Final Office Action Issued in U.S. Appl. No. 12/412,258", dated Oct. 19, 2011, 20 Pages.
"Notice of Allowance Issued in Russian Patent Application No. 2011139151", dated Jun. 24, 2015, 18 Pages.
"Office Action Issued in Russian Patent Application No. 2011139151", dated Nov. 25, 2014, 6 Pages.
"Notice of Allowance Issued in Japanese Patent Application No. 2012-502133", dated Feb. 20, 2014, 4 Pages.
"Notice of Allowance Issued in Japanese Patent Application No. 2012-502135", dated Feb. 20, 2014, 5 Pages.
"Office Action Issued in Canadian Patent Application No. 3,003,789", dated Sep. 16, 2019, 4 Pages.

* cited by examiner

ADJUSTING GUEST MEMORY ALLOCATION IN VIRTUAL NON-UNIFORM MEMORY ARCHITECTURE (NUMA) NODES OF A VIRTUAL MACHINE

CROSS REFERENCE TO RELATED CASES

This application is a continuation of U.S. patent application Ser. No. 12/412,272, filed on Mar. 26, 2009, now U.S. Pat. No. 9,529,636 B2, Dec. 27, 2016, the entirety which is incorporated herein by reference.

BACKGROUND

Virtualization technology allows for sharing hardware resources between multiple partitions, each of which can host a guest operating system. Generally, virtual machine technology can be used to consolidate servers and increase their portability. As virtual machines become larger, and their workloads increase, the ability to easily consolidate and/or migrate them from one computer system to another becomes more difficult. Accordingly, techniques for increasing the ability to consolidate and/or migrate larger virtual machines are desirable.

SUMMARY

An example embodiment of the present disclosure describes a method. In this example, the method includes, but is not limited to receiving a request to instantiate a virtual machine, the request including a characteristic for the virtual machine; selecting a virtual NUMA node topology for the virtual machine based on the characteristic, the virtual NUMA node topology including a plurality of virtual NUMA nodes; instantiating the virtual machine on a computer system, the virtual machine including the plurality of virtual NUMA nodes; and adjusting, based on memory pressure in a specific virtual NUMA node of the plurality, an amount of guest memory assigned to the specific virtual NUMA node. In addition to the foregoing, other aspects are described in the claims, drawings, and text forming a part of the present disclosure.

An example embodiment of the present disclosure describes a method. In this example, the method includes, but is not limited to executing a virtual machine, the virtual machine having a topology that includes a plurality of virtual NUMA nodes, wherein the topology of the virtual machine is generated independently from the physical topology of the computer system; determining memory pressure in each virtual NUMA node of the plurality; and adjusting, based on the memory pressure in each virtual NUMA node of the plurality, guest memory assigned to at least one virtual NUMA node of the plurality. In addition to the foregoing, other aspects are described in the claims, drawings, and text forming a part of the present disclosure.

An example embodiment of the present disclosure describes a method. In this example, the method includes, but is not limited to executing a first virtual machine, the virtual machine having a topology that includes a plurality of virtual NUMA nodes, each virtual NUMA node of the plurality including a virtual processor and guest physical addresses, wherein the topology of the virtual machine is generated independently from the physical topology of the computer system; and adding an additional virtual processor to a virtual NUMA node of the plurality. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
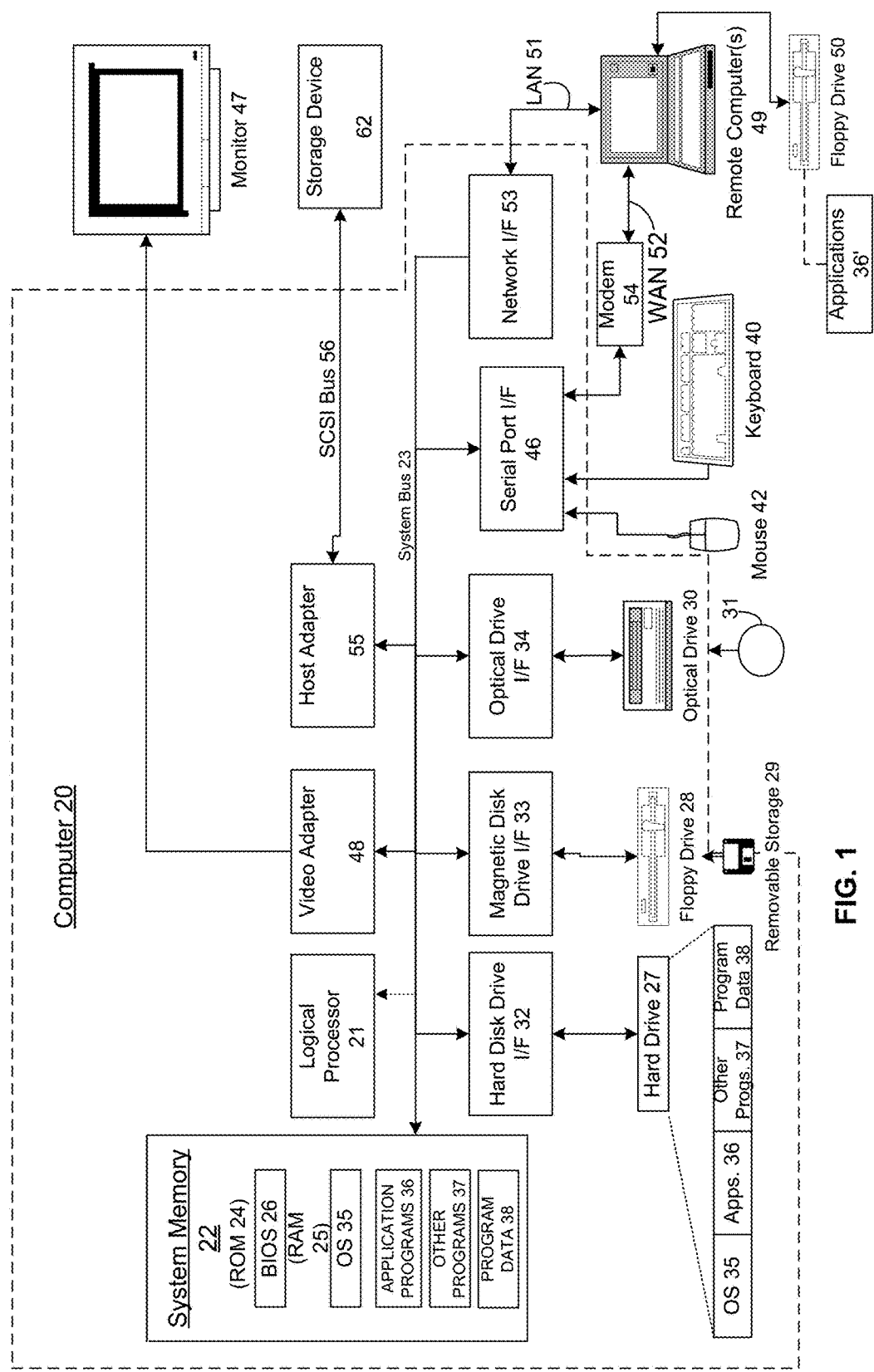
FIG. 1 depicts an example computer system wherein aspects of the present disclosure can be implemented.

Embodiments may execute on one or more computers. FIG. 1 and the following discussion are intended to provide a brief general description of a suitable computing environment in which the disclosure may be implemented. One skilled in the art can appreciate that the computer system of FIG. 1 can in some embodiments effectuate computer systems 200, 300, 600, and 700. In these example embodiments, the computer systems can include some or all of the components described in FIG. 1 and circuitry configured to instantiate aspects of the present disclosure.

The term circuitry used through the disclosure can include hardware components such as hardware interrupt controllers, hard drives, network adaptors, graphics processors, hardware based video/audio codecs, and the firmware/software used to operate such hardware. In the same or other embodiments the term circuitry can include microprocessors configured to perform function(s) by firmware or by switches set in a certain way. In the same or other example embodiments the term circuitry can include one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be processed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is one of design choice and left to an implementer.

Referring now to FIG. 1, an exemplary general purpose computing system is depicted. The general purpose computing system can include a conventional computer 20 or the like, including a logical processor 21, a system memory 22, and a system bus 23 that couples various system components including the system memory to the logical processor 21. The system bus 23 may be any of several types of bus structures including a memory bus or memory controller, a peripheral bus, and a local bus using any of a variety of bus architectures. The system memory can include read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer readable storage media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable storage media which can store data that is accessible by a computer, such as magnetic cassettes, flash memory cards, digital video disks, Bernoulli cartridges, random access memories (RAMs), read only memories (ROMs) and the like may also be used in the exemplary operating environment. Generally, in certain embodiments, such computer readable storage media can be used to store processor executable instructions embodying aspects of the present disclosure.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the logical processor 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
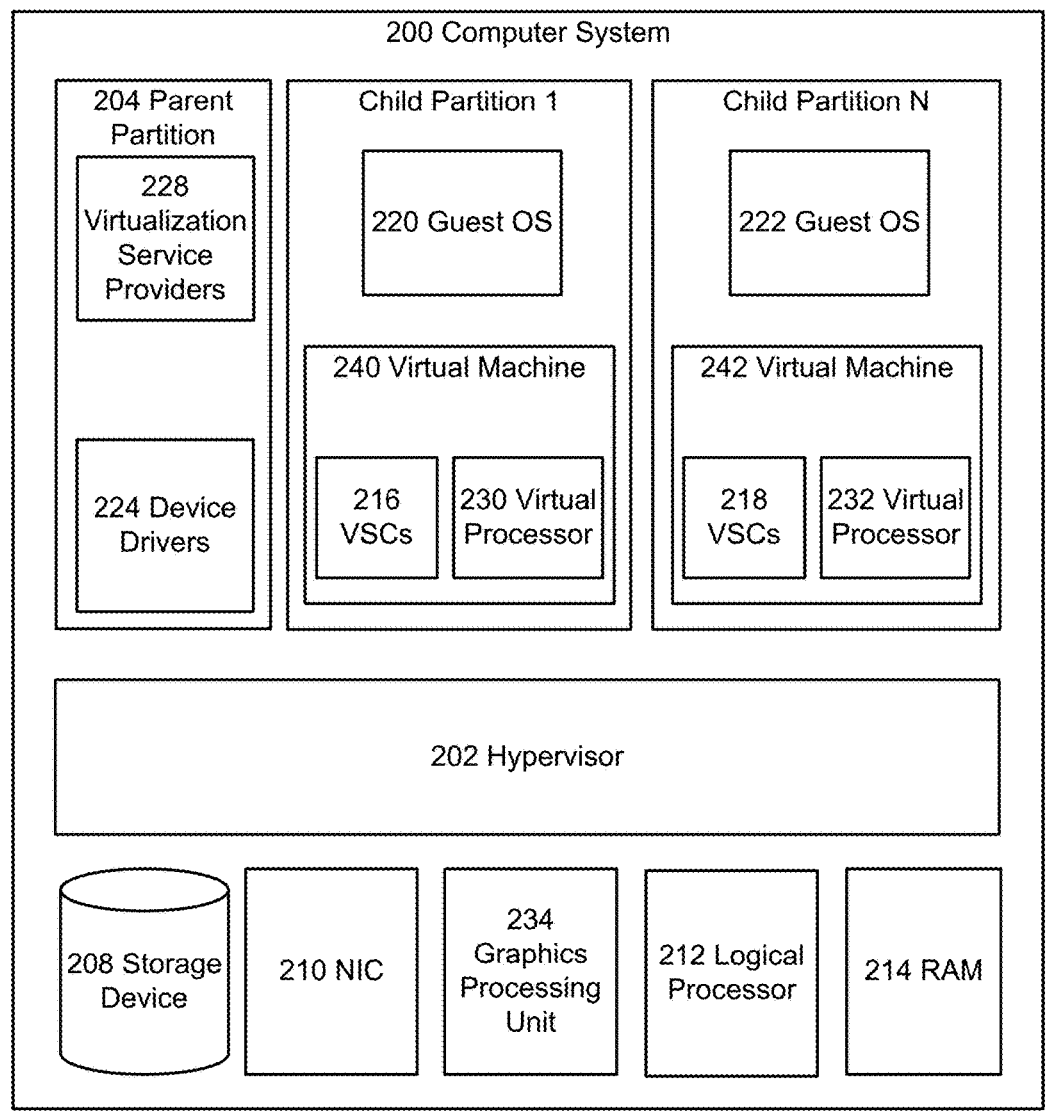
FIG. 2 depicts an operational environment for practicing aspects of the present disclosure.
Figure 3:
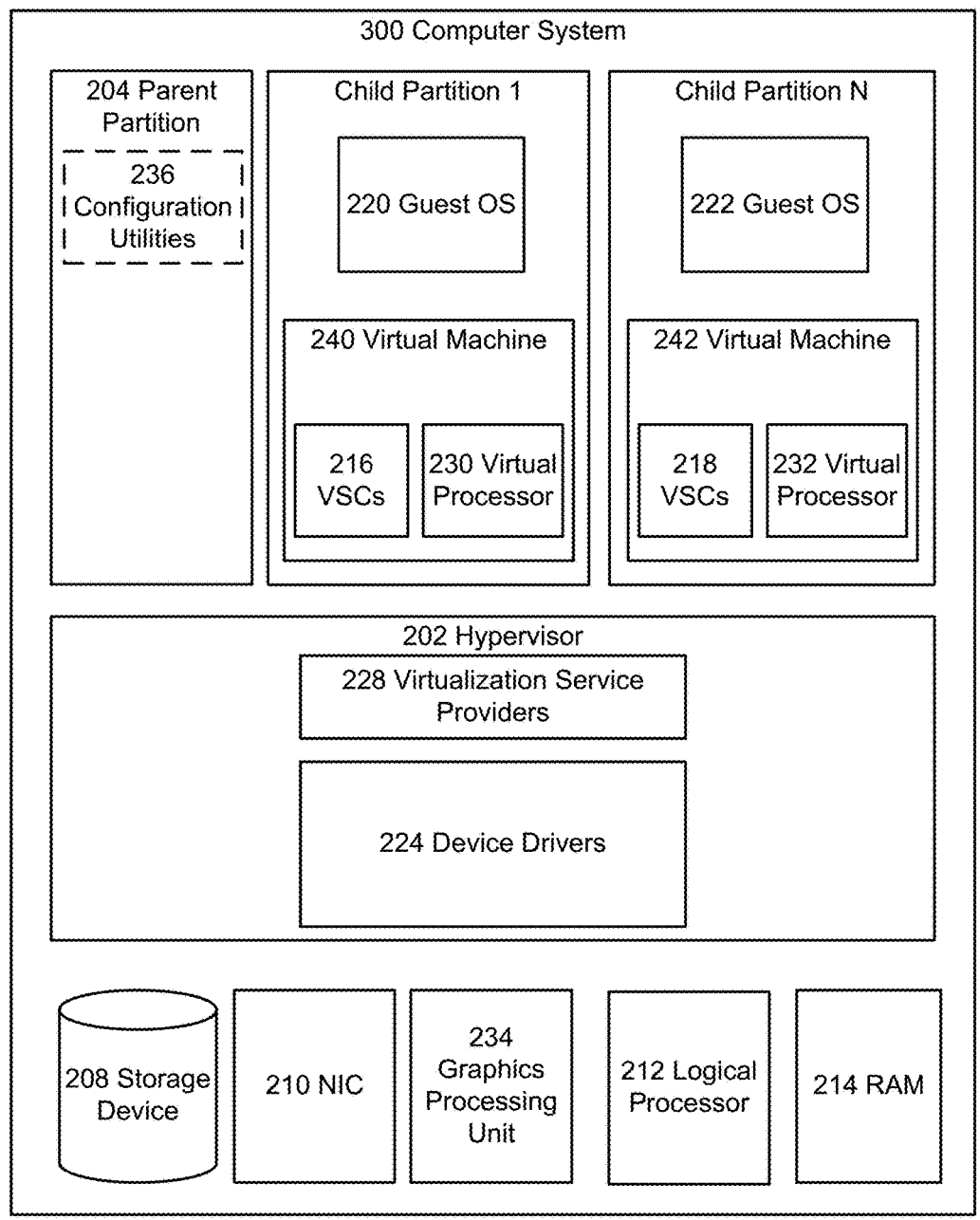
FIG. 3 depicts an operational environment for practicing aspects of the present disclosure.

Referring now to FIGS. 2 and 3, they depict high level block diagrams of computer systems. As shown by the figure, computer system 200 can include physical hardware devices such as a storage device 208, e.g., a hard drive, a network interface controller (NIC) 210, a graphics card 234, at least one logical processor 212, and random access memory (RAM) 214. Computer system 200 can also include similar components as computer 20 of FIG. 1. While one logical processor is illustrated, in other embodiments computer system 200 may have multiple logical processors, e.g., multiple execution cores per processor and/or multiple processors that could each have multiple execution cores. Continuing with the description of FIG. 2, depicted is a hypervisor 202 that may also be referred to in the art as a virtual machine monitor. The hypervisor 202 in the depicted embodiment includes executable instructions for controlling and arbitrating access to the hardware of computer system 200. Broadly, the hypervisor 202 can generate execution environments called partitions such as child partition 1 through child partition N (where N is an integer greater than 1). In embodiments a child partition can be considered the basic unit of isolation supported by the hypervisor 202, that is, each child partition can be mapped to a set of hardware resources, e.g., memory, devices, logical processor cycles, etc., that is under control of the hypervisor 202 and/or the parent partition. In embodiments the hypervisor 202 can be a stand-alone software product, a part of an operating system, embedded within firmware of the motherboard, specialized integrated circuits, or a combination thereof.

In the depicted example the computer system 200 includes a parent partition 204 that can be also thought of as domain 0 in the open source community. Parent partition 204 can be configured to provide resources to guest operating systems executing in the child partitions 1-N by using virtualization service providers 228 (VSPs) that are also known as back-end drivers in the open source community. In this example architecture the parent partition 204 can gate access to the underlying hardware. Broadly, the VSPs 228 can be used to multiplex the interfaces to the hardware resources by way of virtualization service clients (VSCs) that are also known as front-end drivers in the open source community. Each child partition can include one or more virtual processors such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, and as illustrated by the figure, the combination of virtual processors, various VSCs, and memory in a partition can be considered a virtual machine such as virtual machine 240 or 242.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. Each guest operating system 220 through 222 can have associated file systems that can have applications stored thereon such as e-commerce servers, email servers, etc., and the guest operating systems themselves. The guest operating systems 220-222 can schedule threads to execute on the virtual processors 230-232 and instances of such applications can be effectuated.

Referring now to FIG. 3, it illustrates an alternative architecture that can be used. FIG. 3 depicts similar components to those of FIG. 2, however in this example embodiment the hypervisor 202 can include the virtualization service providers 228 and device drivers 224, and parent partition 204 may contain configuration utilities 236. In this architecture hypervisor 202 can perform the same or similar functions as the hypervisor 202 of FIG. 2. The hypervisor 202 of FIG. 3 can be a stand alone software product, a part of an operating system, embedded within firmware of the motherboard or a portion of hypervisor 202 can be effectuated by specialized integrated circuits. In this example parent partition 204 may have instructions that can be used to configure hypervisor 202 however hardware access requests may be handled by hypervisor 202 instead of being passed to parent partition 204.

Figure 4:
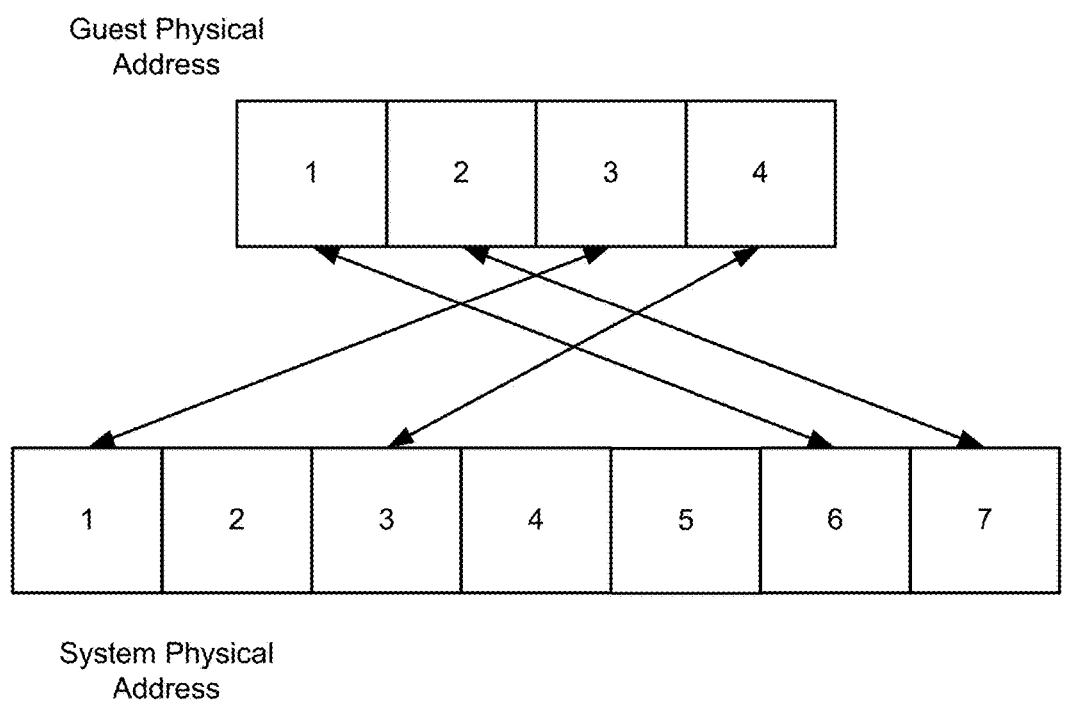
FIG. 4 depicts how memory can be arranged in embodiments of the present disclosure.

Referring now to FIG. 4, it illustrates how memory can be arranged in embodiments that include virtual machines. For example, a computer system such as computer system 200 can have RAM 214 having memory addresses. Instead of reporting the system physical memory addresses to virtual machines, the hypervisor 202 can present different addresses for the system physical addresses, e.g., guest physical addresses (GPAs), to memory managers of guest operating systems. Guest operating systems can then manipulate the guest physical addresses and hypervisor 202 maintains the relationship by the GPAs and the SPAs. As shown by the figure, in an embodiment the GPAs and SPAs can be arranged into memory blocks. Broadly, a memory block can include one or more pages of memory. The relationship between the GPAs and the SPAs can be maintained by shadow page table such those described in commonly assigned U.S. patent application Ser. No. 11/128,665 entitled "Enhanced Shadow Page Table Algorithms," the content of which is herein incorporated by reference by its entirety. In operation, when a guest operating system stores data in GPA of block 1, the data may actually be stored in a different SPA such as block 6 on the system.

Figure 5:
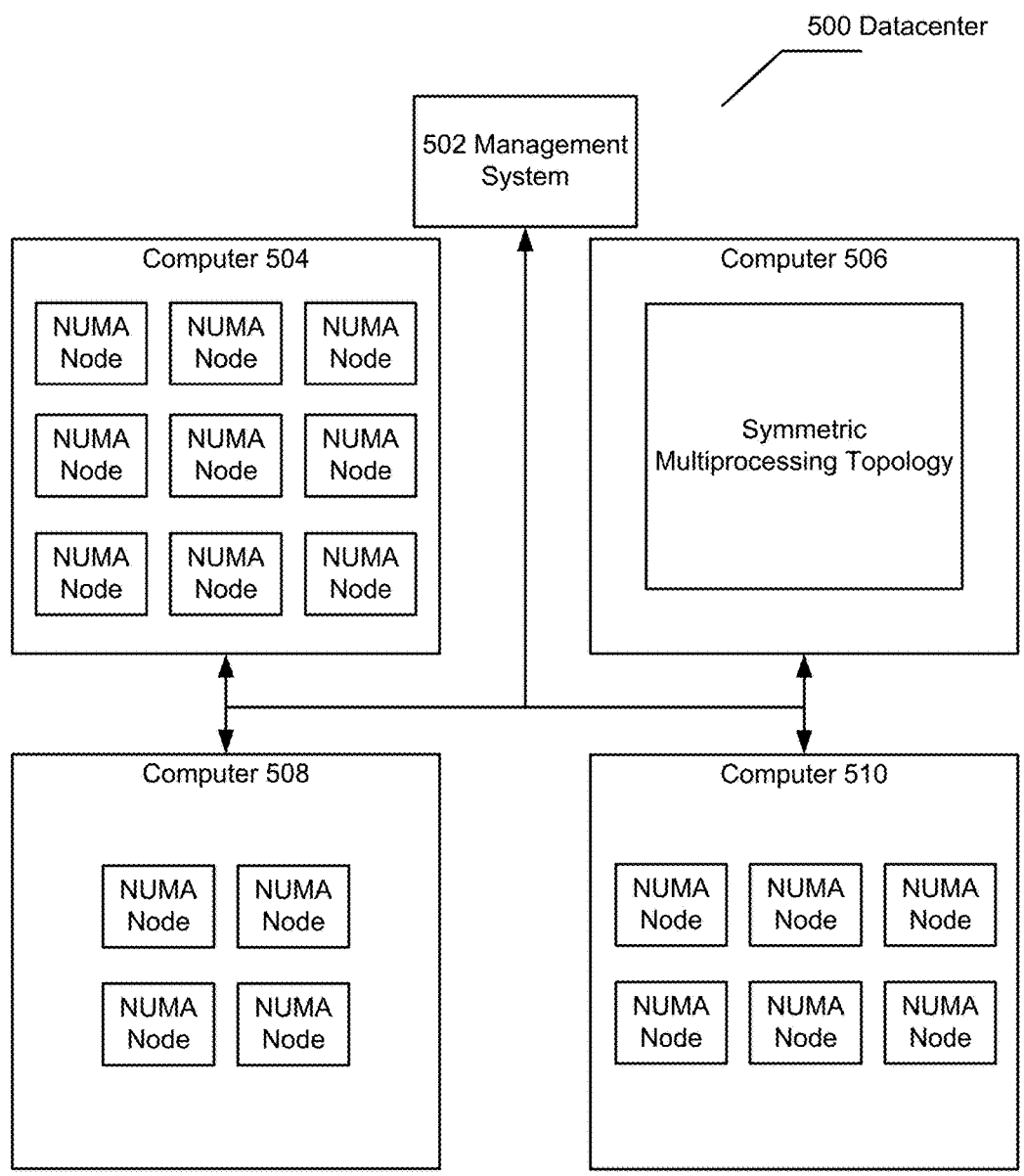
FIG. 5 depicts an example operational environment practicing aspects of the present disclosure.

Briefly FIG. 5 depicts an operational environment for practicing aspects of the present disclosure. For example, a number of computer systems 504-510 can be coupled together in a datacenter 500 (While four computer systems are depicted, one of skill in the art can appreciate that datacenter 500 can include more or fewer computer systems). The depicted computer systems can have different topologies and moreover, they can have different characteristics, e.g., different amounts of RAM, different RAM speeds, different amount of logical processors, and/or logical processors with different speeds.

The management system 502 can have components similar to computer system 20 of FIG. 1, and/or computer systems 200, 300, 600 or 700. That is, in an embodiment the management system 502 may be a computer system that includes subject matter described below with respect to FIG. 6 or FIG. 7.

Figure 6:
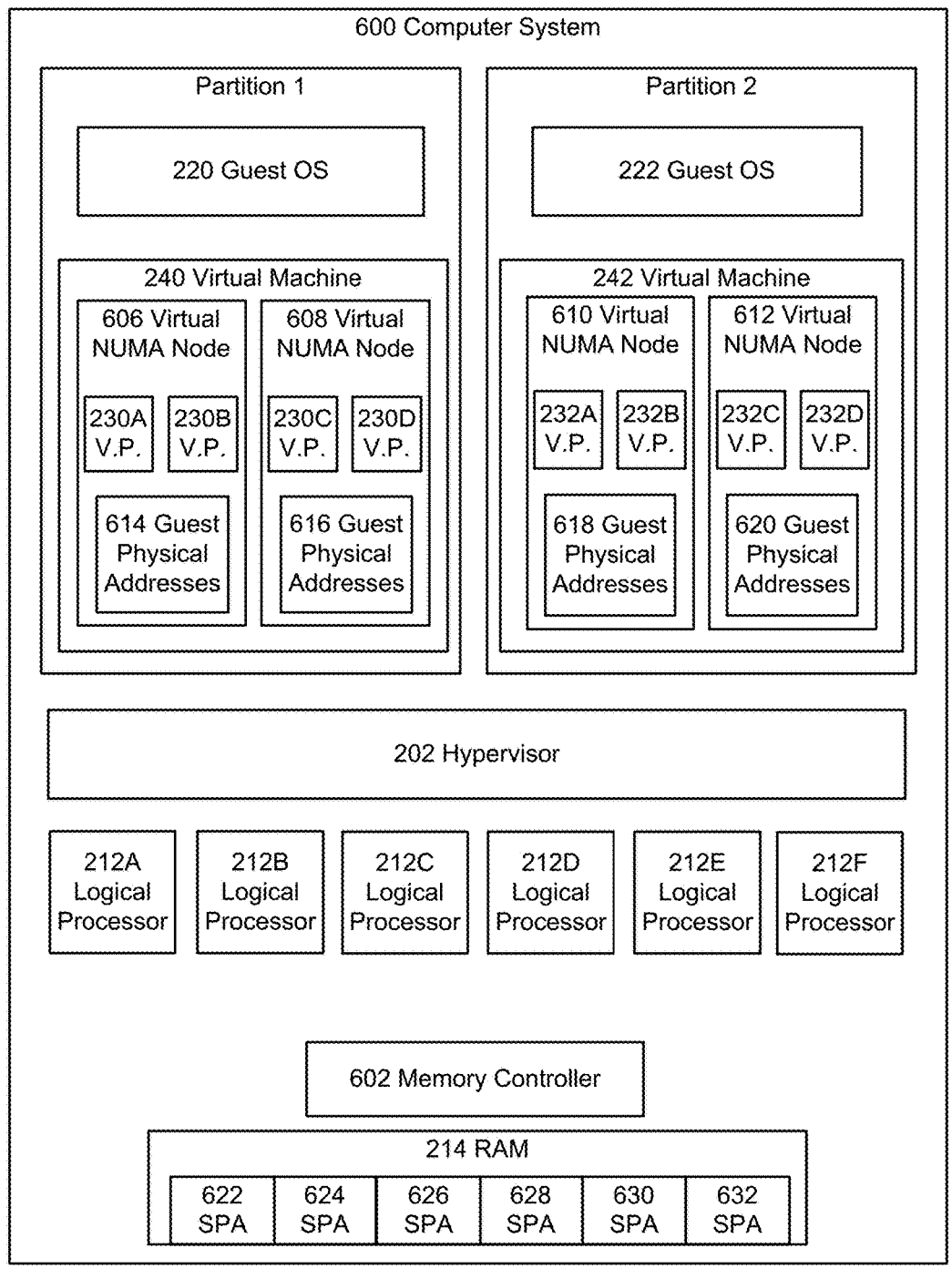
FIG. 6 depicts an example operational environment practicing aspects of the present disclosure.

Continuing with the general overview of the figures, FIG. 6 depicts a computer system 600 having a symmetric multiprocessing topology (SMP) or 'flat' topology. Generally, SMP is a computer architecture that includes a plurality of processors that are connected to a single shared memory. In this arraignment, a memory controller 602 can manage the flow of data to and from memory. Memory access may be uniform with respect to each logical processor 212A-F and each logical processor can access the entire range of memory, i.e., system physical addresses 622-632. This topology works well for computer systems with a relatively small number of processors, but when the computer system includes many processors, all competing for access to the shared memory bus, performance of the system can decrease. Moreover, the complexity of the computer system significantly increases which in turn drives the price per processor up.

Briefly, computer system 600 can include the same, or similar components as computer 200 or 300. As shown by the figure, computer system 600 can have a plurality of logical processors 212A-212F (while six logical processors are depicted the computer system could have more or less) coupled together via a memory controller 602 that gates access to RAM 214. Similar to that described above, each logical processor 212A-212F can have different characteristics, e.g., clock speeds, cache size, etc. In this arraignment the memory controller 602 can manage the flow of data to and from the RAM 214.

Hypervisor 202 can be instantiated and it can control the hardware of the computer system 600. Hypervisor 202 can manage one or more virtual machines 240 through 242 that each can have virtual NUMA nodes such as virtual NUMA nodes 606-612. Virtual NUMA nodes 606-612 can be used to organize the virtual machine's resources by reporting virtual topologies to guest applications or guest operating systems such as guest operating systems 220 and 222. As shown by the figure, each virtual NUMA node 606-612 can have one or more virtual processors 230A-D, 232A-D and guest physical addresses 614-616, and 618-620. Generally, hypervisor 202 can back each virtual NUMA node 606-612 with one or more logical processors and system physical addresses from RAM 214. That is, hypervisor 202 can set one or more logical processors as idea processors that can be used to run virtual processors threads.

Figure 7:
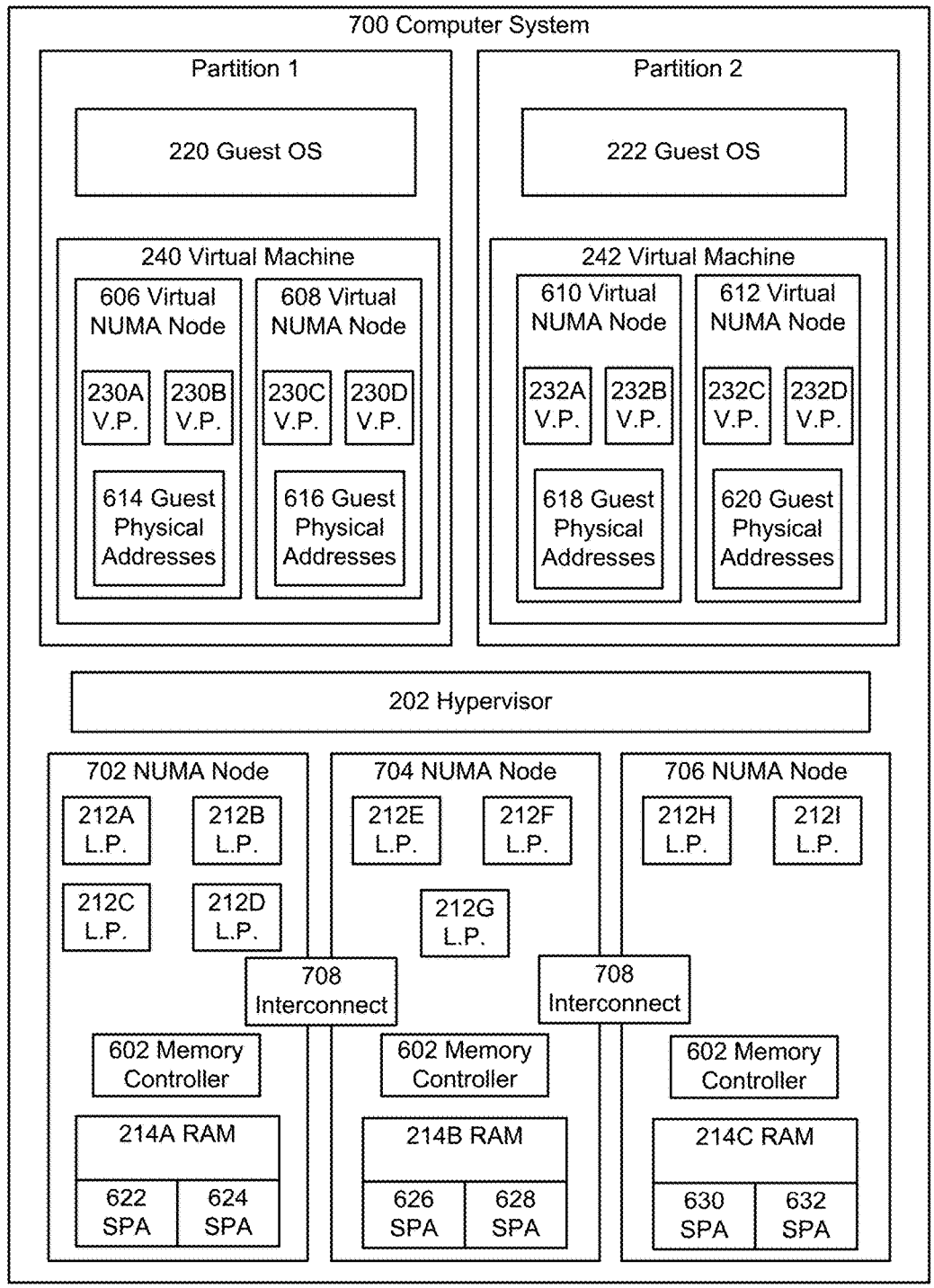
FIG. 7 depicts an example operational environment practicing aspects of the present disclosure.

Briefly, FIG. 7 depicts a computer system 700 having a topology that includes NUMA nodes 702-706. Computer systems with NUMA nodes are can be generally though of as computers that are made up of smaller computer systems. In this example, each NUMA node 606-612 can include one or more logical processors and local memory. The memory inside of a NUMA node is considered local memory and memory in other NUMA nodes is considered remote memory because the only the processors inside of the node are connected to the same memory bus. The NUMA nodes are interconnected by cache coherency domain interconnects which allow processors in one NUMA node to access memory in other NUMA nodes in a coherent way. Thus, system physical addresses 622-632 are uniform with respect to each processor. Or put another way, system physical address 20,000 is the same for every processor in the computer system. The difference is that for some processors memory address 20,000 is a local memory address, e.g., inside their NUMA node, and for other processors memory address 20,000 is remote, e.g., outside their NUMA node. Generally, local memory can be accessed faster than remote memory and the relationship between local v. remote access time is called a NUMA ratio. A NUMA ratio of 1 to 2 means that it costs twice as many processor cycles to access a particular remote system physical address than a local system physical address. NUMA alleviates bottlenecks caused by SMP systems by limiting the number of processors on any one memory bus and is generally less expensive than a SMP computer system with the same amount of logical processors.

Computer system 700 can include the same, or similar components as computer 200 or 300. As shown by the figure, in this operational environment computer system 700 includes three NUMA nodes 702-706 (although the computer can have more or less) connected by interconnects 708. As illustrated by the figure, the number of processors within each NUMA node can be variable and each node can have its own RAM.

Similar to FIG. 7, a hypervisor 202 can control the hardware of the computer system 700. When guest operating systems or monolithic applications boot they can detect the topologies of the virtual machines 240 and 242 similar to that described above. Each virtual NUMA node 606-612 can be assigned one or more ideal processors and system physical addresses from the same NUMA node that can be used to run virtual processor's threads.

While computer system 600 and 700 are depicted as including two virtual machines 240 and 242, in other embodiments they can execute more or fewer virtual machines. Moreover, while each virtual machine is depicted has having two virtual NUMA nodes, in other embodiments the virtual machines can have more or fewer virtual NUMA nodes. Also, while virtual NUMA nodes are depicted as having two virtual processors, in other embodiments the virtual NUMA nodes can have more or fewer virtual processors. Furthermore, each virtual NUMA node can have a different topology than other virtual NUMA nodes, e.g., one virtual NUMA node can have 4 virtual processors and 8 gigabytes of RAM while another virtual NUMA node can have 2 virtual processors and 4 gigabytes of RAM.

Figure 8:
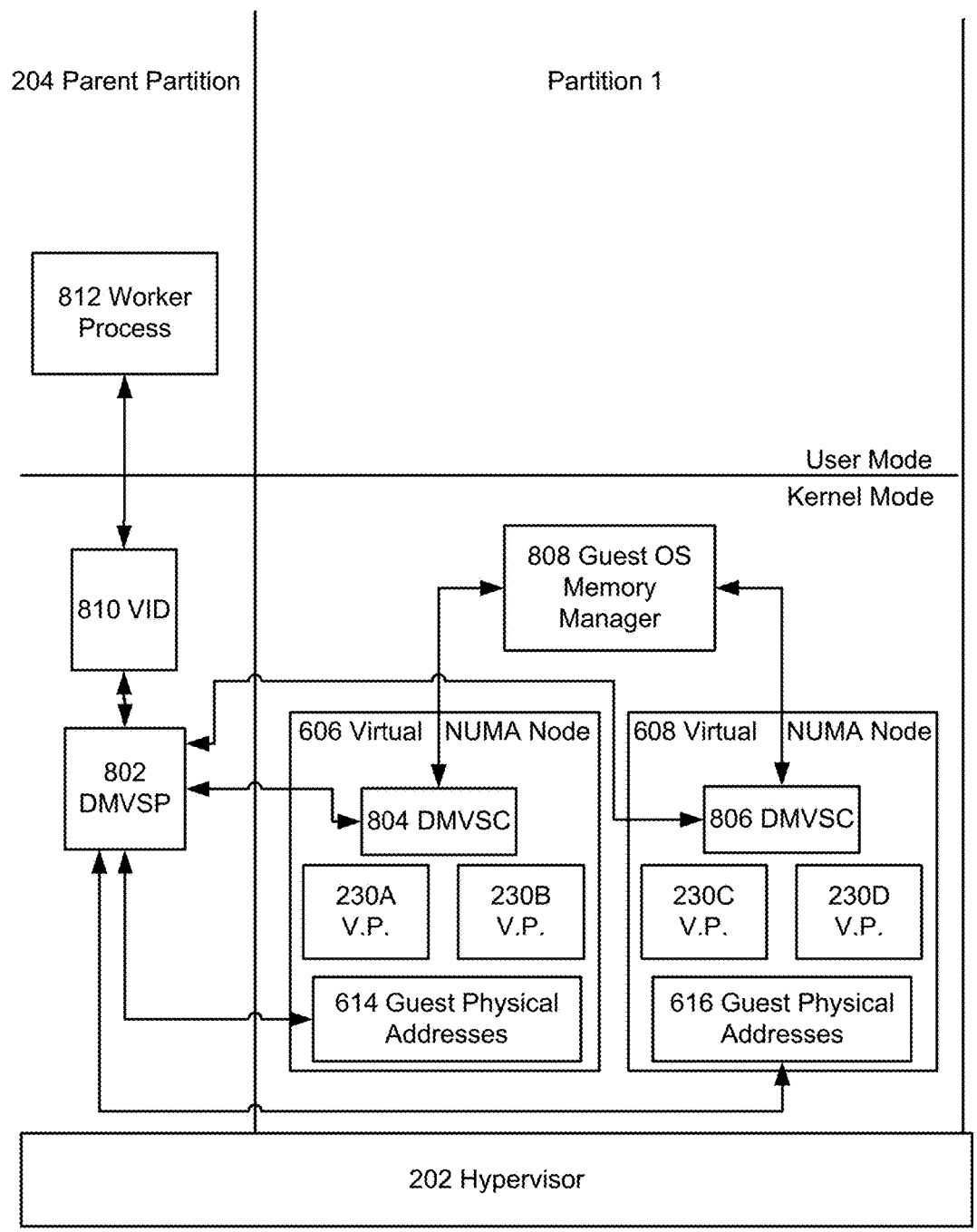
FIG. 8 depicts an example block diagram that illustrates aspects of the present disclosure.

FIG. 8 depicts a block diagram environment that can be used in aspects of the present disclosure. As shown by the figure, a component which manages memory assigned to a virtual machine that can be known as a dynamic memory virtualization service provider 802 (DMVSP) is illustrated and can be used to adjust the amount of memory accessible to a virtual NUMA node. As shown by the figure, DMVSP 802 can be associated with one or more ballooning drivers that can be known as virtualization service clients, namely dynamic memory virtualization service clients 804 and/or 806 (DMVSCs) (while one DMVSC per virtual NUMA node is depicted, in other embodiments one DMVSC per partition may be used). Broadly, DMVSCs 804 and/or 806 can provide information that can be used by DMVSP 802 to adjust the memory of virtual NUMA nodes and each DMVSC can also help commit and de-commit memory from the virtual NUMA node it is associated with. DMVSCs 804, 806, and DMVSP 802 can communicate by way of a virtualization bus described in U.S. patent application Ser. No. 11/128,647, entitled "Partition Bus," the content of which is incorporated by reference in its entirety. Moreover, further aspects of DMVSCs and DMVSPs are described in U.S. patent application Ser. No. 12/345,469, entitled "Dynamic Virtual Machine Memory Management," the content of which is incorporated by reference in its entirety.

Continuing with the description of FIG. 8, the system can include a worker process 812 is depicted that can manage the child partition(s). The worker process 812 can work in conjunction with the a virtualization infrastructure driver 810 (VID) which can allocate memory to a child partition. For example, the VID 810 can establish and remove the relationships between guest physical addresses and system physical addresses. FIG. 8 also depicts a partition that can include a guest operating system such as guest operating system 220 which can include a memory manager 808. Generally, memory manager 808 can allocate memory to applications at their request and free the memory when it is no longer needed by applications.

The following are a series of flowcharts depicting implementations of processes. For ease of understanding, the flowcharts are organized such that the initial flowcharts present implementations via an overall "big picture" viewpoint and subsequent flowcharts provide further additions and/or details. Furthermore, one of skill in the art can appreciate that the operational procedure depicted by dashed lines are considered optional.

Figure 9:
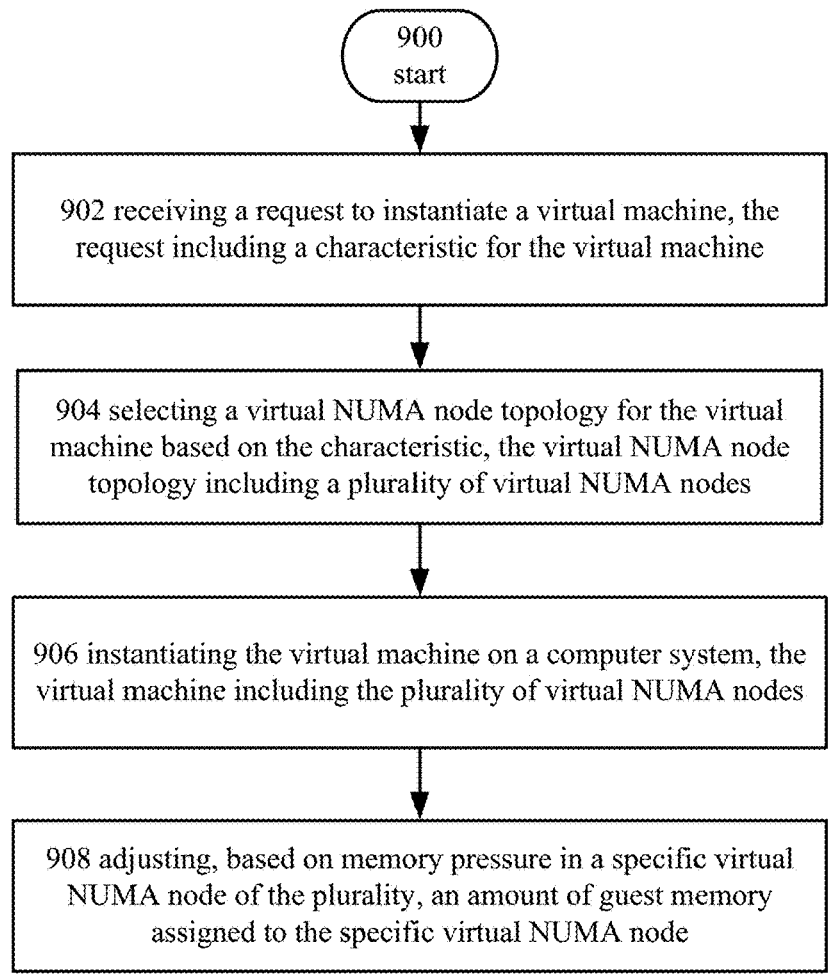
FIG. 9 depicts operational procedure for practicing aspects of the present disclosure.

Turning now to FIG. 9, it depicts an operational procedure for practicing aspects of the present disclosure including operations 900-910. The operational procedure begins with operation 900 and operation 902 illustrates receiving a request to instantiate a virtual machine, the request including a characteristic for the virtual machine. For example, and referring to FIG. 6 or 7, hypervisor 202 can receive a request to create a virtual machine such as virtual machine 240. For example, the request can be received from a management system 502, a parent partition 204 of FIG. 2 or 3, etc. The request can be for a new virtual machine or it can be a request to instantiate a previously saved virtual machine. When virtual machine 240 is a new virtual machine, the characteristics of virtual machine, e.g., an amount of RAM assigned to the virtual machine, a number of virtual processors, or what type of I/O devices the virtual machine should have, can be set by, for example, an administrator.

Continuing with the description of FIG. 9, operation 904 shows selecting a virtual NUMA node topology for the virtual machine based on the characteristic, the virtual NUMA node topology including a plurality of virtual NUMA nodes. For example, a process in the parent partition 204 (and/or hypervisor 202) can determine a topology for the virtual machine 240 based on the received characteristic. For example, parent partition 204 can include information that identifies a default size for a virtual NUMA node such as virtual NUMA node 606. A process in parent partition 204 can use the information that describes the default size and the desired characteristic to determine the number of virtual NUMA for virtual machine 240. In a specific example, the desired characteristic may be a 6 processor virtual machine with 10 gigabytes of RAM. If the default size of a virtual NUMA node includes 2 virtual processors and 4 gigabytes of RAM then management system 502 can generate a configuration file that indicates that virtual machine 240 will include 3 virtual NUMA nodes.

In an embodiment the default virtual NUMA node size can be set by an administrator or by management system 502. Turning to FIG. 5, management system 502 can execute one or more programs that can obtain information that identifies the physical topology of computer systems 504-510 in datacenter 500, e.g., information that identifies how many NUMA nodes (if any) each computer system 504-510 has, how much RAM each computer system 504-510 has, the speed of the RAM, how the RAM is arranged, processor speeds, how many cores each processor has, etc.

Generally, the size of the virtual NUMA node influences the operation of virtual machines in datacenter 500. For example, as the size of a virtual NUMA node increases, e.g., in memory and/or processors, the portability of the virtual NUMA node decrease. Or put another way, large virtual NUMA nodes may make it more difficult to migrate the virtual machine. This occurs because a virtual NUMA node needs to be assigned to either a NUMA node or a computer system that has enough 'flat' resources to effectuate the virtual NUMA node. If, for example, a virtual NUMA node is too large, e.g., it has too RAM or too many virtual processors, it won't be able to fit in smaller NUMA nodes in datacenter 500 thus limiting the ability to migrate the virtual machine. Moreover, if the larger virtual NUMA node is simply assigned to multiple smaller NUMA nodes performance of the virtual machine will decrease because of the difference that exists between local memory and remote memory access times.

On the other hand, as the size of the virtual NUMA node decreases performance of the guest operating system may be adversely impacted. This inefficiency may occur because the guest operating system will try to segregate applications and it's own execution to single virtual NUMA nodes. The guest operating system will be constrained in this case and performance will decrease.

Accordingly, in an embodiment management system 502 can strike a balance between portability and efficiency by determining an optimum virtual NUMA node size for datacenter 500. For example, in an embodiment a logical processor of management system 502 can execute a program and determine the average size of a NUMA node in the datacenter, e.g., the average number of logical processors, average amount of RAM, etc., and set the size of the virtual NUMA node to be the same or smaller than the average NUMA node in the system. In another embodiment the program can be configured to set the size of the virtual NUMA node to be slightly smaller than the smallest NUMA node in the datacenter 500. In an embodiment, the size of the virtual NUMA node can be set to be slightly smaller than the average size or smallest size so that if the computer system becomes heavily committed, more than one virtual NUMA node can be assigned to a single NUMA node. In a specific example, if the smallest NUMA node has 4 logical processors and 8 gigabytes of RAM, then the size of the virtual NUMA node could be set to, for example, 2 virtual processors and 4 gigabytes of RAM.

Operation 906 shows instantiating the virtual machine on a computer system, the virtual machine including the plurality of virtual NUMA nodes. In an embodiment, hypervisor 202 can be executed by a logical processor and a virtual machine having the plurality of virtual NUMA nodes can be instantiated. For example, and referring to FIG. 6 and/or FIG. 7, virtual machine 240 having virtual NUMA nodes 606-608 can be effectuated by computer system 600 or 700. That is, VID 810 can back guest physical addresses of virtual machine 240 with system physical addresses from RAM and virtual processors with one or more logical processors. For example, blocks of guest physical addresses 614 can be backed with blocks of system physical addresses 622 and blocks of guest physical addresses 616 can be backed by blocks of system physical addressees 624. Hypervisor threads can then be scheduled on the logical processors backing the virtual processors and instructions indicative of the virtual processors can be executed. As shown by FIG. 6 and FIG. 7, the topology of each virtual machines can be created independently from the topology of the underlying hardware. That is, each virtual machine's topology is decoupled from the underlying physical topology of the computer system that effectuates it.

In an embodiment the virtual machine BIOS or boot firmware can describe the virtual machine's topology, e.g., whether it has virtual NUMA nodes, the size of any virtual NUMA nodes, and NUMA ratios for the virtual NUMA nodes, to a guest operating system of monolithic application. The data structure can be processed and guest OS 220 or an application and it can be used to by the OS or application to take advantage of the presence of virtual NUMA nodes. For example, guest operating system 220 can try to affinitize the threads of an application that is not NUMA aware to a virtual NUMA node so that execution of the application remains local. In another example a database management program such as SQL Server can allocate locks local to the virtual NUMA nodes and the database can split up read/write requests across the virtual NUMA nodes. In yet another example the guest operating system 220 can create page pools for each virtual NUMA node in the virtual machine.

Continuing with the description of FIG. 9, operation 908 shows adjusting, based on memory pressure in a specific virtual NUMA node of the plurality, an amount of guest memory assigned to the specific virtual NUMA node. For example, a logical processor, logical processor 212A of FIG. 6 or 7 for example, can execute instructions indicative of DMVSP 802 and can adjust the amount of guest physical addresses that are available to a virtual NUMA node such as virtual NUMA node 606. That is, the DMVSP 802 can be executed and memory can be committed or de-committed based on the pressure that the virtual NUMA nodes are experiencing.

In an embodiment, memory pressure can identify how performance of guest operating system 220 is affected by the amount of memory that is available to each virtual NUMA node 606-608. This information can be calculated during the runtime of guest operating system 220 by, for example, one or more DMVSCs such as DMVSC 804 and/or 806 and sent to DMVSP 802. For example, memory pressure can be represented by a series of values that can identify a different level of memory pressure in a virtual NUMA node. As the resources in a virtual NUMA node become more stressed, i.e., as the amount of memory required to efficiently execute the current workload on a virtual NUMA node increases, the DMVSC 804 can revise the value and communicate this information to the DMVSP 802.

In an embodiment, the memory pressure information can be calculated by DMVSC 804 from information received from guest operating system 220. For example, DMVSC 804 can be configured to receive operating system paging information from the memory manager 808 for the virtual NUMA node 606. Guest operating system paging rates can be monitored through two counters that are exposed by memory manager 808 and a cache manager, namely the paging rate and the cache rotation rate.

In the same or another embodiment DMVSC 804 can receive physical memory notifications associated with virtual NUMA node 606 from memory manager 808 and use this information to compute the memory pressure of virtual NUMA node 606. For example, memory manager 808 can output high-memory notifications and low-memory notifications based on activity in guest operating system 220 that is associated with virtual NUMA node 606. Memory manager 808 can trigger these notifications based on a low-memory threshold (LMT) and a high-memory threshold (HMT). In a specific example embodiment, the default level of available memory that signals a low-memory-resource notification event can be approximately 32 MB per 4 GB, to a maximum of 64 MB. The default level that signals a high-memory-resource notification event can be, for example, three times the default low-memory value. Intermediate memory availability levels between the two can be determined by dividing the interval between the high-memory threshold and low-memory threshold levels. One skilled in the art can appreciate that these values are exemplary and that changes can be made without departing from the spirit of the disclosure.

These notifications, along with others, can be used by DMVSC 804 to calculate the memory pressure of virtual NUMA node 606. For example, each level can be associated with a value, e.g., 0-4 and if any other performance counters are taken into account they can also be associated with values. The values for each performance counter can then be used to calculate the current memory pressure of virtual NUMA node 606. In a specific example, the memory pressure can be calculated by taking the higher or lower of the performance counter values. In another example the average value of the performance counters can be used as the memory pressure. In yet another embodiment a more sophisticated algorithm can be used to calculate the memory pressure that takes into account the previous performance counter values and assigns each performance counter a scalar to affect its relative weight in the calculation.

When a decision to commit memory is made DMVSP 802 can use a variety of techniques, one of which is a hot-add operation. For example, certain operating systems can support a hot-add, which allows ranges of physical memory to be added to a running operating system without requiring a system reboot. That is, memory manager 808 can be configured to support dynamic addition of memory to a running system. In a hot-add embodiment, DMVSC 804 can be configured to access a hot-add interface of memory manager 808 and DMVSC 804 can send a message to guest operating system 220 that describes the hot-added GPAs and which virtual NUMA node they are associated with. Memory manager 808 can then make the new memory available to guest operating system 220, drivers, applications, or any other processes that are running on virtual NUMA node 606. For example, DMVSC 804 can receive the hot-added memory addresses from DMVSP 802 after VID 810 generates the relationships between GPAs and SPAs.

Similarly, a hot-remove operation can be used to de-commit memory addresses from a virtual NUMA node such as virtual NUMA node 606. For example, DMVSC 804 can send a message to guest operating system 220 that indicates that memory has been hot-removed. DMVSC 804 can request that memory manager 808 provide blocks of GPAs from virtual NUMA node 606 for removal. In this example DMVSC 804 can then call a removal API of memory manager 808 and remove the GPAs from guest operating system 220. In an embodiment where hot-remove is used, the memory that is removed is not counted against the guest current commit, and memory manager 808 can adjust its internal counters using similar techniques that are used by an operating system to remove memory that is physically removed from a motherboard.

In another embodiment memory can be de-committed to a virtual NUMA node by using a ballooning technique. That is, memory can be de-committed by dissociating guest physical addresses in virtual NUMA 606 node from the physical addresses that back them. For example, logical processor 212B can execute instructions indicative of the DMVSC 804 and can send a message to memory manager 808 requesting that memory manager 808 reserve a certain amount of memory for use by DMVSC 804, e.g., one or more memory blocks. Memory manager 808 can lock memory for exclusive use within DMVSC 804 and DMVSC 804 can send the GPAs of the memory to DMVSP 802. In this example DMVSP 802 can send the GPAs to VID 810 and VID 810 can remove entries for these GPAs to SPAs in the shadow page table. In this example, memory manager 808 may include information that identifies that the GPAs are still valid, however in actuality the GPAs are no longer backed by system physical addresses. In this example memory manager 808 won't use the locked GPAs and the SPAs backing them can be reallocated.

Guest physical addresses that have been dissociated can be re-associated with physical addresses. In this example a request to commit memory pages can be received by VID 810 and VID 810 can obtain SPAs to satisfy the request and send the range of addresses to DMVSP 802. In an embodiment VID 810 can be configured to obtain a contiguous range of SPAs in order to increase system efficiency. In this example VID 810 can determine that the guest operating system 220 has GPAs that are locked for exclusive use by the DMVSC 804 associated with virtual NUMA node 606. VID 810 can create relationships between the locked GPAs and the SPAs and send a message to DMVSP 802. DMVSP 802 can then send a message to DMVSC 804 and DMVSC 804 can send a message to memory manager 808 indicating that the GPAs can be unlocked and returned to a memory pool of memory manager 808 that is associated with virtual NUMA node 606.

In an embodiment VID 810 can determine whether to use a hot-add technique or a ballooning technique depending on whether GPAs are ballooned. For example, when VID 810 receives SPAs to commit to NUMA node 606 it can determine whether any GPAs are locked by DMVSC 804. In the instance that there are locked GPAs, VID 810 can back them with SPAs before it hot-adds memory. Before memory is committed to virtual NUMA node 606 it can be zeroed and its associated cache lines can be flushed for security reasons. By zeroing the memory the contents of memory previously associated with one partition do not leak to another partition.

Figure 10:
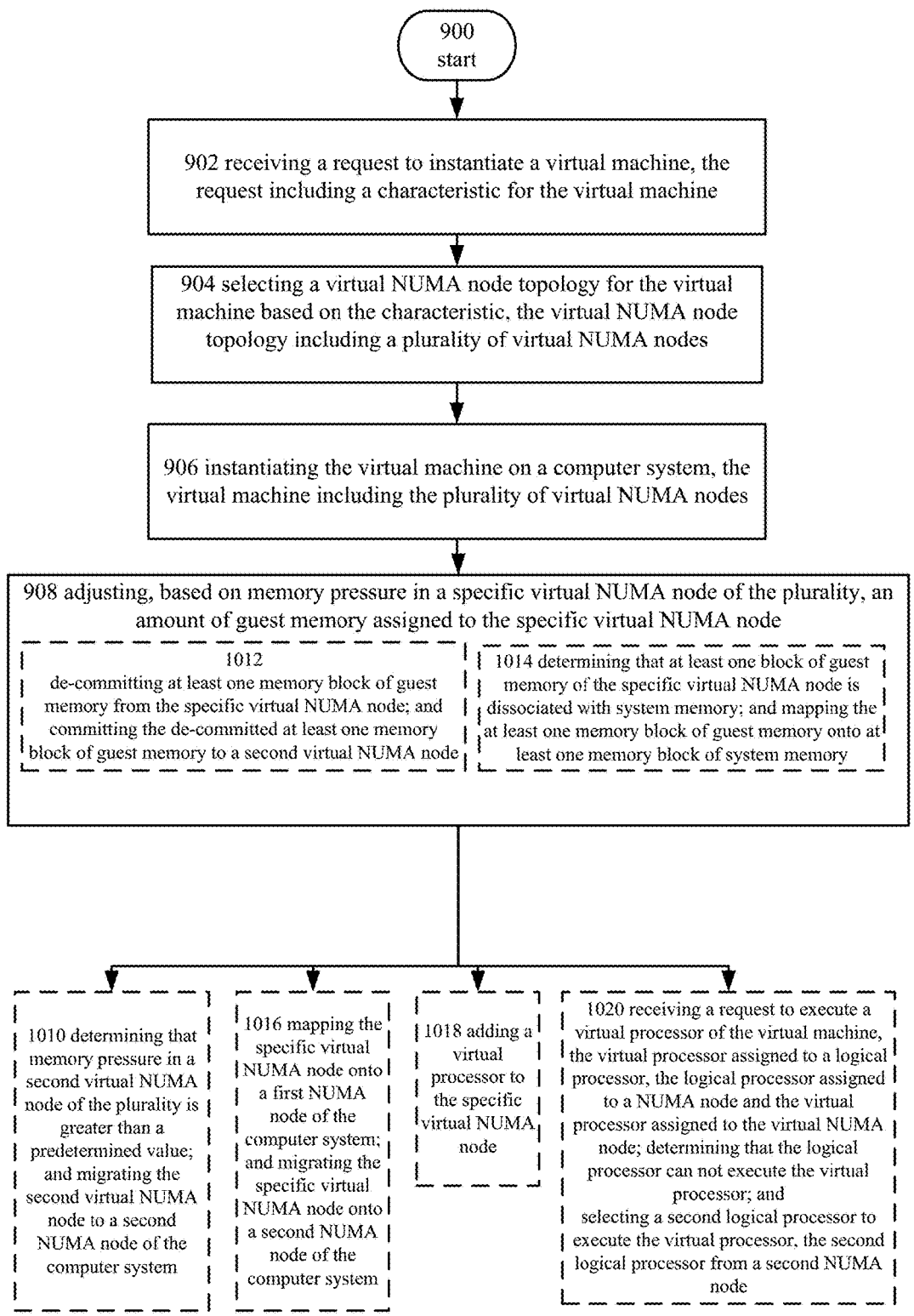
FIG. 10 depicts an alternative embodiment of the operational procedure of FIG. 9.

Turning now to FIG. 10, it depicts an alternative embodiment of the operational procedure of FIG. 9 including additional operations 1010-1020. Operation 1010 shows determining that memory pressure in a second virtual NUMA node of the plurality is greater than a predetermined value; and migrating the second virtual NUMA node to a second NUMA node of the computer system. For example, and turning to FIG. 7, in an embodiment the memory pressure in a second virtual NUMA node 608 can increase. That is, a value indicative of the memory pressure can be received by the DMVSP 802 which indicates that virtual NUMA node 608 is stressed. In this example virtual machine 240 or individual virtual NUMA node 608 can have a target pressure value and the current pressure value may be greater than a target value that was set by an administrator. The target pressure values can be stored in a data structure that can be accessed by DMVSP 802. Current pressure values of the running virtual machines or virtual NUMA nodes can then be received. DMVSP 802 may serially step through the list of running virtual machines or virtual NUMA nodes and commit memory in order to reduce the memory pressure values to the target values, and de-commit memory to increase the pressure to the target values.

In an example, DMVSP 802 can be configured to determine that the NUMA node currently hosting virtual NUMA nodes 606 and 608, e.g., NUMA node 702, is unable to allocate enough memory in order to obtain the target memory pressure values for both virtual NUMA nodes. In this example DMVSP 802 can be configured to send a signal to hypervisor 202 and hypervisor 202 can be configured to attempt to move one of the virtual NUMA nodes off NUMA node 702. Hypervisor 202 can check the current workload of NUMA nodes 702-706 and determine that, for example, NUMA node 704 can host the virtual NUMA node and allocate enough resources to it to decrease the memory pressure to the target value. In this example hypervisor 202 can be configured to reassign virtual NUMA node 608 to NUMA node 704. That is, hypervisor 202, in conjunction with VID 810, can remap the guest physical addresses 616 to system physical addresses 714, and set logical processors 212E and F as ideal processors for virtual processors 230C and D.

Continuing with the description of FIG. 10, operation 1012 illustrates de-committing at least one memory block of guest memory from the specific virtual NUMA node; and committing the de-committed at least one memory block of guest memory to a second virtual NUMA node. For example, DMVSP 802 can be configured to de-commit memory from, for example, virtual NUMA node 606 and commit the memory to virtual NUMA node 608. In this example, virtual NUMA nodes 606 and 608 may be backed by a single NUMA node, or a 'flat' architecture. In this example embodiment the DMVSP 802 can attempt to free up memory from virtual NUMA node 606 when, for example, there is no available memory available that can be committed to virtual NUMA node 608. In another example, DMVSP 802 can be configured to de-commit memory from, for example, virtual NUMA node 610 and commit the memory to virtual NUMA node 608. That is, memory can be taken from one virtual machine and given to another.

In a specific example, and referring to FIG. 6, virtual NUMA nodes 606 and 608 can be mapped to the resources of computer system 600. In this example, DMVSP 802 can check the other virtual NUMA nodes in, for example, order of memory priority starting with, for example, low priority virtual NUMA nodes in virtual machine 240 or the lowest-priority virtual machine. If, for example, a virtual NUMA node is detected, such as virtual NUMA node 606, that has a memory pressure value that is less than a target threshold, the DMVSP 802 can initiate a memory de-commit and remove memory from virtual NUMA node 606. After the de-commit is complete a commit operation can be initiated and memory can be hot-added to virtual NUMA node 608 or ballooned guest physical addresses can be re-associated with system physical addresses.

In a specific example, and referring to FIG. 7, DMVSP 802 can check the other virtual NUMA nodes that are backed by the same NUMA node 702 in, for example, order of memory priority. If, for example, a virtual NUMA node on the same NUMA node as virtual NUMA node 608 is detected that has a memory pressure value that is less than a target threshold, DMVSP 802 can initiate a memory de-commit. After the de-commit is complete a commit operation can be initiated and memory can be hot-added to virtual NUMA node 608 or ballooned guest physical addresses can be re-associated with system physical addresses.

Continuing with the description of FIG. 10, operation 1014 depicts determining that at least one block of guest memory of the specific virtual NUMA node is dissociated with system memory; and mapping the at least one memory block of guest memory onto at least one memory block of system memory. For example, in an embodiment DMVSP 802 can be executed by a logical processor and a determination can be made to back GPAs in virtual NUMA node 606 with SPAs 624. For example, GPAs may be reserved by DMVSC 804 and the SPAs may be reallocated to either another virtual NUMA node or the parent partition 204. In this example a request to commit memory pages can be received by VID 810 and VID 810 can obtain SPAs to satisfy the request and send the range of addresses to the DMVSP 802. In an embodiment VID 810 can be configured to obtain a contiguous range of SPAs in order to increase system efficiency. In a NUMA embodiment, VID 810 can be configured to obtain a contiguous range of SPAs from the same NUMA node that is running virtual NUMA node 606. VID 810 can create relationships between the locked GPAs and the SPAs and send a message to DMVSP 802. DMVSP 802 can then send a message to DMVSC 804 and DMVSC 804 can send a message to memory manager 808 indicating that the GPAs can be unlocked and returned to a memory pool associated with virtual NUMA node 606.

Continuing with the description of FIG. 10, operation 1016 illustrates mapping the specific virtual NUMA node onto a first NUMA node of the computer system; and migrating the specific virtual NUMA node onto a second NUMA node of the computer system. For example, and referring to FIG. 7, guest operating system 220 can be spread across at least two NUMA nodes such as NUMA nodes 702 and 704. For example, and referring to FIG. 7, hypervisor 202 can schedule virtual NUMA nodes 606 and 608 to run on NUMA node 702. In this example hypervisor 202 can receive a signal that indicates that NUMA node 702 is stressed. For example, guest operating system 220 may generate signals that indicate that virtual NUMA nodes 606 and 608 are low on memory. In this example, hypervisor 202 can be configured to reduce the workload on the stressed NUMA node by moving virtual NUMA node 608 off NUMA node 702.

Continuing with the description of FIG. 10, operation 1018 illustrates adding a virtual processor to the specific virtual NUMA node. For example, in an embodiment a virtual processor such as virtual processor 230B can be added during the runtime execution of virtual machine 240 using, for example, a processor hot-add operation. That is, virtual NUMA node 606 may only have a single virtual processor 230A at one point and then another is added. In an embodiment the newly added processor can be assigned to the processor backing virtual processor 230A or another logical processor can be allocated to run virtual processor 230B threads. In a NUMA embodiment, if a another logical processor is being used to back the virtual processor 230B, it can be allocated from the same NUMA node 702 that is backing other virtual processors in virtual NUMA node 606.

Continuing with the description of FIG. 10, operation 1020 illustrates receiving a request to execute a virtual processor of the virtual machine, the virtual processor assigned to a logical processor, the logical processor assigned to a NUMA node and the virtual processor assigned to the virtual NUMA node; determining that the logical processor can not execute the virtual processor; and selecting a second logical processor to execute the virtual processor, the second logical processor from a second NUMA node. For example, and referring to FIG. 7, in an embodiment hypervisor 202 can receive a request to execute a virtual processor thread from virtual processor 230A and attempt to schedule the thread on an idea processor 212A, e.g., a processor backing virtual processor 230A. In this example, hypervisor 202 can detect that logical processor 212A is overcommitted and unable to execute the virtual processor thread. In this case, hypervisor 202 can be executed and it can select another logical processor to execute the virtual processor thread. For example, hypervisor 202 can attempt to select a different logical processor on the same NUMA node. If, for example, the NUMA node is overcommitted hypervisor 202 can be configured to select a remote processor to execute virtual processor 230A, e.g., logical processor 212E. In this example the decision as to whether or not to wait or schedule the thread on a remote node can be made using the NUMA ratio associated with NUMA node 704. If the NUMA ratio is low, and the expected wait for the ideal processor is long, then the decision to schedule the thread on NUMA node 704 can be made. On the other hand, if the NUMA ratio is high, and the expected wait time is low, then the decision to wait can be made.

Figure 11:
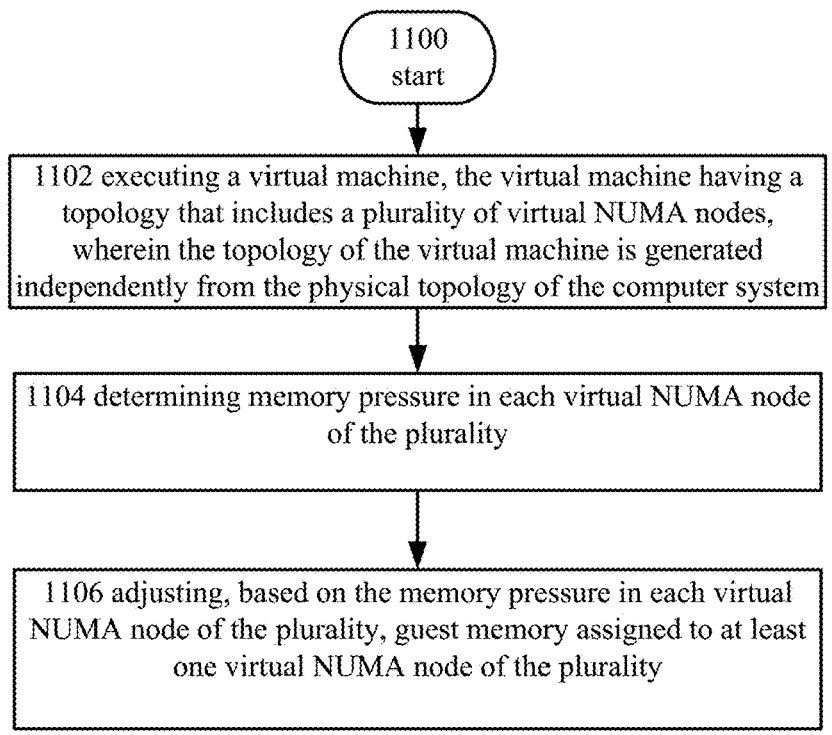
FIG. 11 depicts operational procedure for practicing aspects of the present disclosure.

Turning now to FIG. 11, it depicts an operational procedure for practicing aspects of the present disclosure including operations 1100, 1102, 1104, and 1106. Operation 1100 beings the operational procedure and operation 1102 shows executing a virtual machine, the virtual machine having a topology that includes a plurality of virtual NUMA nodes, wherein the topology of the virtual machine is generated independently from the physical topology of the computer system. For example, hypervisor 202 can execute a virtual machine having a plurality of virtual NUMA nodes. As shown by FIG. 6, virtual machine 240 can be created that includes virtual NUMA nodes 606 and 608. The virtual NUMA nodes can each have one or more virtual processors 230A-D and guest physical addresses 614 and 616. In this embodiment virtual NUMA nodes 606 and 608 can be created independently from the topology of the underlying hardware. That is, the topology of the virtual machine is unrelated to the underlying hardware such as is depicted by FIG. 6 and FIG. 7. Thus, in this embodiment, each virtual machine's topology is decoupled from the underlying physical topology of the computer system that effectuates it.

Continuing with the description of FIG. 11, operation 1104 illustrates determining memory pressure in each virtual NUMA node of the plurality. For example, and referring to FIG. 8, memory pressure for each virtual NUMA node 606 and 608 can be obtained, e.g., generated and/or received. Memory pressure information can identify how performance of the guest is affected by the amount of memory that is available to each virtual NUMA node 606-608. This information can be calculated during the runtime of guest operating system 220 by, for example, one or more DMVSCs such as DMVSC 804 and/or 806 and sent to the DMVSP 802. That is, in a specific embodiment a logical processor can execute instructions indicative of the DMVSC 804 or 806 and generate memory pressure information for each virtual NUMA node. This information can then be sent to the DMVSP 802 for example.

In an example embodiment the memory pressure information can include a series of values ranging from 0-4, and each value can identify a different level of memory pressure that the guest OS is experiencing due to the resources of the virtual NUMA nodes 606-608. As the guest operating system becomes more stressed, i.e., as the amount of memory required to efficiently execute the current workload increases, the DMVSCs 804 and 806 can revise their values and communicate this information to the DMVSP 802.

Continuing with the description of FIG. 11, operation 1106 shows adjusting, based on the memory pressure in each virtual NUMA node of the plurality, guest memory assigned to at least one virtual NUMA node of the plurality. In an embodiment that includes operation 1206, a logical processor 212A can execute instructions indicative of DMVSP 802 and can adjust the amount of guest physical addresses in a virtual NUMA node 606 for example. That is, DMVSP 802 can commit or de-commit memory based on the memory pressure in virtual NUMA node 606, e.g., if processes allocated to virtual NUMA node 606 are stressed, memory can be committed.

In an embodiment, when the logical processor 212, configured by DMVSP 802, determines to commit or de-commit memory it can do so on a per memory block basis. For example, DMVSP 802 can commit/de-commit a memory block and check how the memory status changes. If memory status has not changed, DMVSP 802 can commit/de-commit another memory block.

Figure 12:
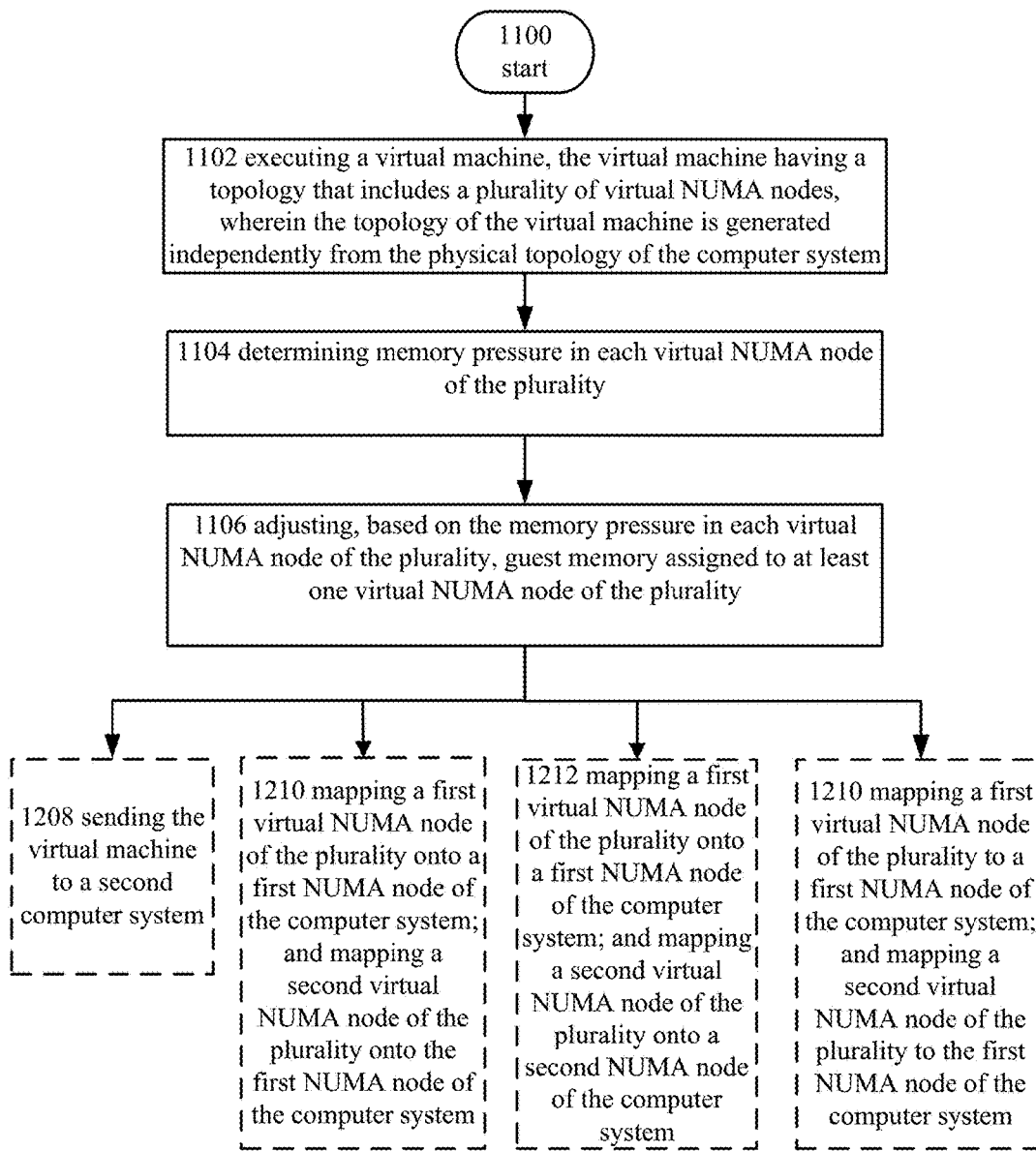
FIG. 12 depicts an alternative embodiment of the operational procedure of FIG. 11.

Turning now to FIG. 12, it depicts an alternative embodiment of the operational procedure 1100 of FIG. 11 including operations 1208-1216. As illustrated by the figure, operation 1208 shows sending the virtual machine to a second computer system. For example, and referring to FIG. 5, in an embodiment the state of a virtual machine can be saved in one or more configuration files and sent to another computer system, e.g., sent from computer 504 to 506. The hypervisor of computer system 506 can read the file or files and instantiate the virtual machine.

Virtual machine topology affects the ability to migrate and restore virtual machines. Specifically, the decision to allow the topology of the underlying hardware to be detected and the size of the virtual NUMA nodes influence how well a virtual machine will execute and whether it can be easily migrated. For example, the size of the virtual NUMA nodes affects the ability to migrate, e.g., as the size of a virtual NUMA node increases the portability of the virtual NUMA node decrease and as the size of the virtual NUMA node decreases so does performance of the virtual machine. In addition, virtual machines that can detect underlying computer's topology can not be easily migrated due to the fact that NUMA aware operating systems and applications optimize themselves at boot time based on first topology they detect and these optimizations may not work well on computers that the virtual machine may be migrated to in the future. Thus, by exposing virtual NUMA nodes to the guest operating system when it boots the operating system can be optimized to use NUMA nodes. By sizing the virtual NUMA nodes correctly, the virtual machine can be optimized for many diverse computer systems in datacenter 500.

For example, and referring to FIG. 6, virtual machine 240 can include two or more virtual NUMA nodes 606 and 608. The hypervisor 202 can back the virtual processors 230A-D with logical processors 212A-D. When the guest operating system 220 boots it can detect the virtual NUMA nodes 606 and 608 and can be configured to optimize the scheduling and execution of processes to use the virtual NUMA nodes 606 and 608. After some time the virtual machine 240 may be migrated to a computer system having a physical topology similar to that depicted by FIG. 7. The hypervisor 202 of FIG. 7 can back the virtual processors 230A and B with logical processors 212A and B and back virtual processors 230C and D with logical processors 212E and F. Guest operating system 220 can continue to operate in the same manner as it was when running on the computer system of FIG. 6 even though the underlying computer topology has changed from SMP to NUMA.

Continuing with the description of FIG. 12, operation 1210 shows mapping a first virtual NUMA node of the plurality onto a first NUMA node of the computer system; and mapping a second virtual NUMA node of the plurality onto the first NUMA node of the computer system. For example, and referring to FIG. 7, a logical processor such as logical processor 212A can execute hypervisor instructions and can affinitize virtual NUMA nodes such as virtual NUMA node 606 and 608 to a NUMA node such as NUMA node 702. More specifically, the logical processor can back guest physical addresses 614 and 616 with system physical addresses from RAM 214 of NUMA node 702 and can back virtual processors 230A through D with logical processors 212A through D.

Continuing with the description of FIG. 12, operation 1212 shows mapping a first virtual NUMA node of the plurality onto a first NUMA node of the computer system; and mapping a second virtual NUMA node of the plurality onto a second NUMA node of the computer system. For example, and referring to FIG. 7, a logical processor such as logical processor 212A can execute hypervisor instructions and can assign a virtual NUMA node 606 to NUMA node 702 and assign virtual NUMA node 608 to NUMA node 704. In this example, when hypervisor 202 is executed, a hypervisor scheduler can schedule threads from virtual processors 230A-B on logical processors 212A-D and schedule threads from virtual processor 230C or D on logical processors 212E through G.

Figure 13:
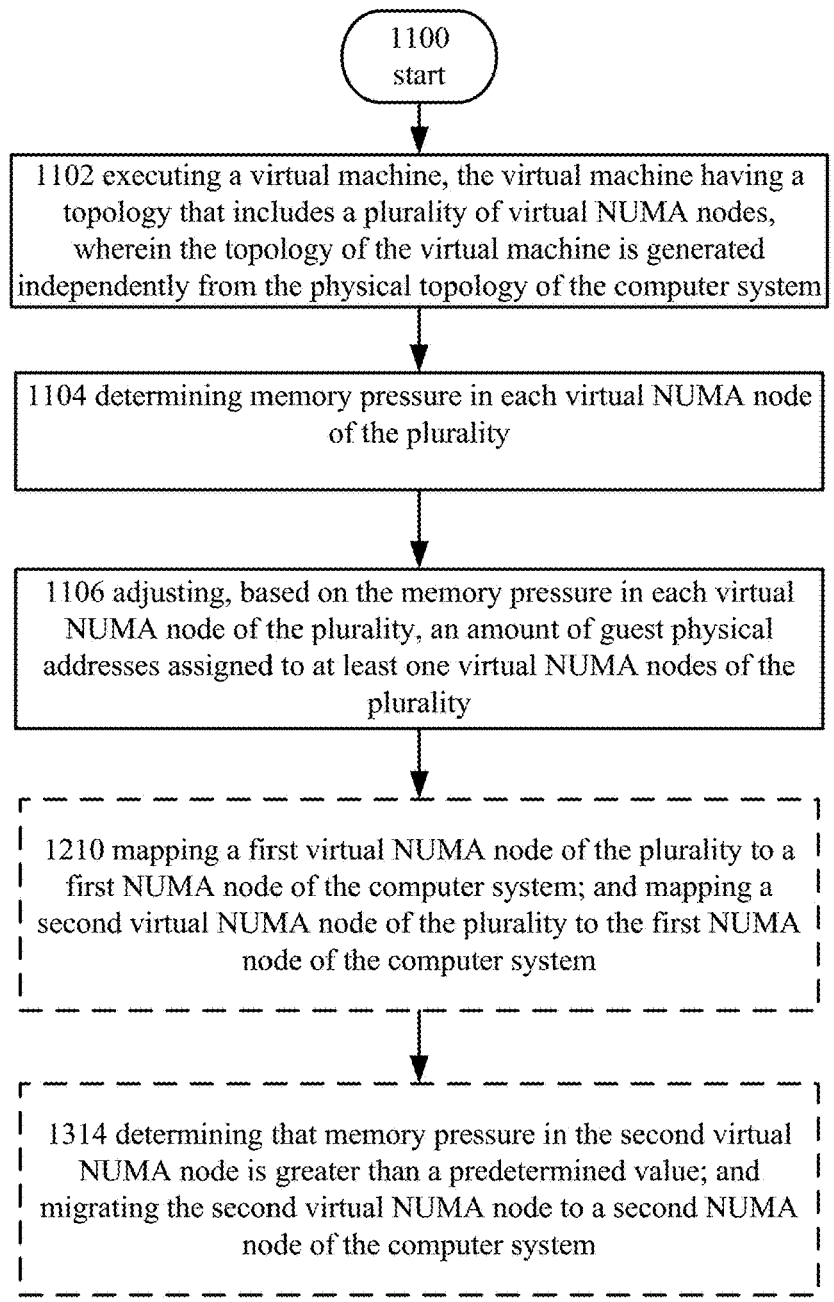
FIG. 13 depicts an alternative embodiment of the operational procedure of FIG. 12.

Turning now to FIG. 13, it illustrates an alternative embodiment of the operational procedure of FIG. 12 including operation 1314 which shows determining that memory pressure in the second virtual NUMA node is greater than a predetermined value; and migrating the second virtual NUMA node to a second NUMA node of the computer system. For example, and turning to FIG. 7, in an embodiment the memory pressure in the second virtual NUMA node 608 can increase. That is, a value indicative of the memory pressure can be received by the DMVSP 802 which indicates that the virtual NUMA node 608 is stressed. In this example each virtual NUMA node 606-612, and/or virtual machine 240-242, can have a target pressure value and the current pressure value for virtual NUMA node 608 may be greater than a target value that was set by an administrator. The target pressure values can be stored in a data structure that can be accessed by DMVSP 802. Current pressure values of the running virtual machines or virtual NUMA nodes can then be received. DMVSP 802 may serially step through the list of running virtual machines or virtual NUMA nodes and commit memory in order to reduce the memory pressure values to the target values, and de-commit memory to increase the pressure to the target values.

Figure 14:
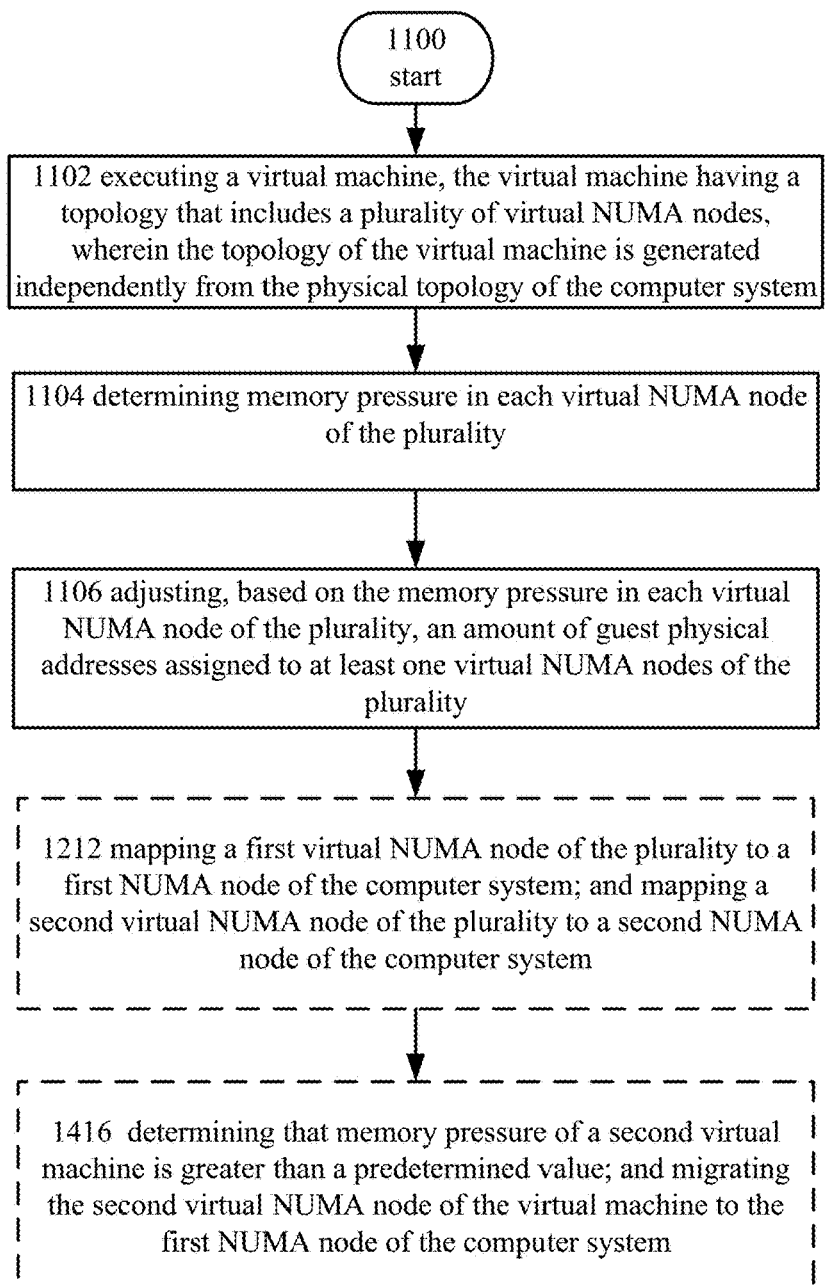
FIG. 14 depicts an alternative embodiment of the operational procedure of FIG. 12.

Turning now to FIG. 14, it illustrates an alternative embodiment of the operational procedure of FIG. 12 including operation 1416 which shows determining that memory pressure of a second virtual machine is greater than a predetermined value; and migrating the second virtual NUMA node of the virtual machine to the first NUMA node of the computer system. In an embodiment at least two virtual machines can be executing, e.g., virtual machines 240 and 242 of In this example virtual NUMA nodes of virtual machine 240 can be mapped to, for example, NUMA nodes 702 and 704 of FIG. 7 and the virtual NUMA nodes of virtual machine 242 can be mapped to, for example NUMA node 706. In this example each virtual machine 240 and 242, and/or each virtual NUMA node 606-612 can have a target pressure value that can be stored in a data structure that can be accessed by DMVSP 802. In this example the memory pressure in the second virtual machine 242 may increase due to activity in the virtual machine, e.g., virtual machine 242 received many read/write requests, and the value can be received by DMVSP 802. DMVSP 802 can receive current pressure values of the running virtual machines or virtual NUMA nodes and serially step through the list of running virtual machines or virtual NUMA nodes to determine whether memory can be committed to virtual machine 242 in order to alleviate the memory pressure.

In a situation where the pressure can not be relieved by committing or de-committing memory, DMVSP 802 can be configured to send a signal to hypervisor 202 and hypervisor 202 can attempt to reallocate the resources of computer system in order to relieve memory pressure. For example, hypervisor 202 can check the current workload of the NUMA nodes 702-706 and determine that, for example, NUMA node 702 can host virtual NUMA nodes from virtual machine 240 and reassign virtual NUMA node 608 to NUMA node 702. That is, hypervisor 202, in conjunction with VID 810, can remap the guest physical addressee 616 to system physical addresses 712, and set logical processors 212A and D as ideal processors for virtual processors 230C and D. Then hypervisor can remap virtual NUMA node 610 to NUMA node 704 and adjust the memory inside each virtual NUMA node 610-612 of virtual machine 242 in order to decrease its memory pressure.

Figure 15:
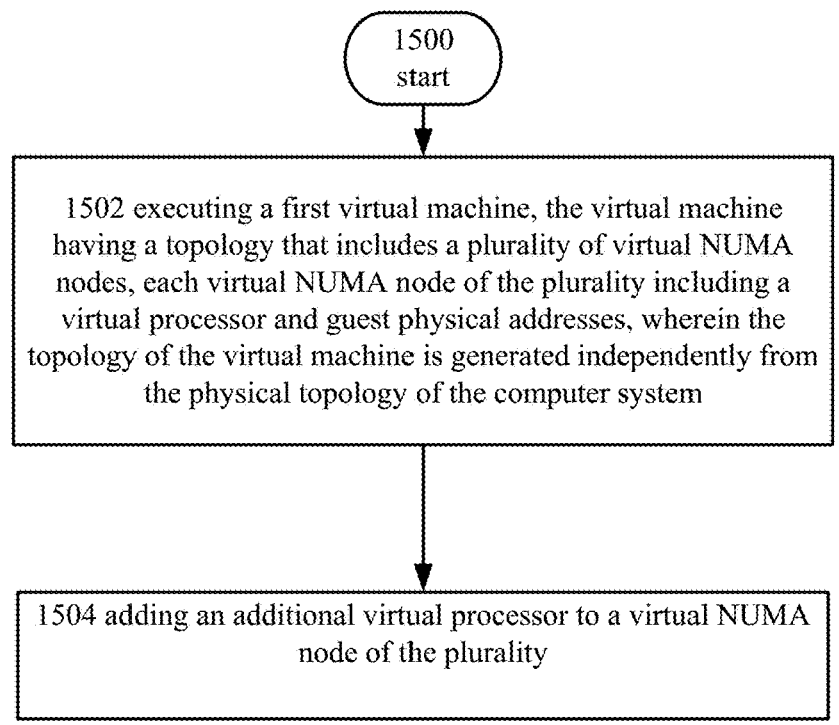
FIG. 15 depicts operational procedure for practicing aspects of the present disclosure.

Turning now to FIG. 15, it illustrates an operational procedure for practicing aspects of the present disclosure including operations 1500, 1502, and 1504. Operation 1500 begins the operational procedure and operation 1502 shows executing a first virtual machine, the virtual machine having a topology that includes a plurality of virtual NUMA nodes, each virtual NUMA node of the plurality including a virtual processor and guest physical addresses, wherein the topology of the virtual machine is generated independently from the physical topology of the computer system. For example, hypervisor 202 of FIG. 7 can execute virtual machine 240 having a plurality of virtual NUMA nodes 608-610. The virtual NUMA nodes 606 and 608 can each have one or more virtual processors 230A-D and guest physical addresses 614 and 616. In this embodiment the virtual NUMA nodes 606 and 608 can be mapped to the resources of the computer system 700. For example, logical processors 212A and B can be set as ideal processors for virtual processor 230A and B and guest physical addresses 614 can be backed by system physical addresses 710. Likewise, logical processors 212E and F can be set as ideal processors for virtual processor 230C and D and guest physical addresses 616 can be mapped to system physical addresses 714. In this embodiment the virtual NUMA nodes 606 and 608 are independent from the topology of the underlying hardware. That is, the topology of the virtual machine is unrelated to the underlying hardware such as is depicted by FIG. 6 and FIG. 7. Thus, in this embodiment, the virtual machine's topology is decoupled from the underlying physical topology of the computer system that effectuates it.

Continuing with the description of FIG. 15, operation 1504 shows adding an additional virtual processor to a virtual NUMA node of the plurality. For example, in an embodiment an additional virtual processor can be added to a virtual NUMA node such as, for example, virtual NUMA node 606. In this example a virtual processor such as virtual processor can be added during the runtime execution of virtual machine 240 using, for example, a processor hot-add operation. In an embodiment the newly added processor can be assigned to the processor backing virtual processor 230A or another logical processor can be set as the ideal processor to run the newly added virtual processor's threads. In a NUMA embodiment logical processors can be allocated from the same NUMA node 702 that is backing the virtual NUMA node 606.

Figure 16:
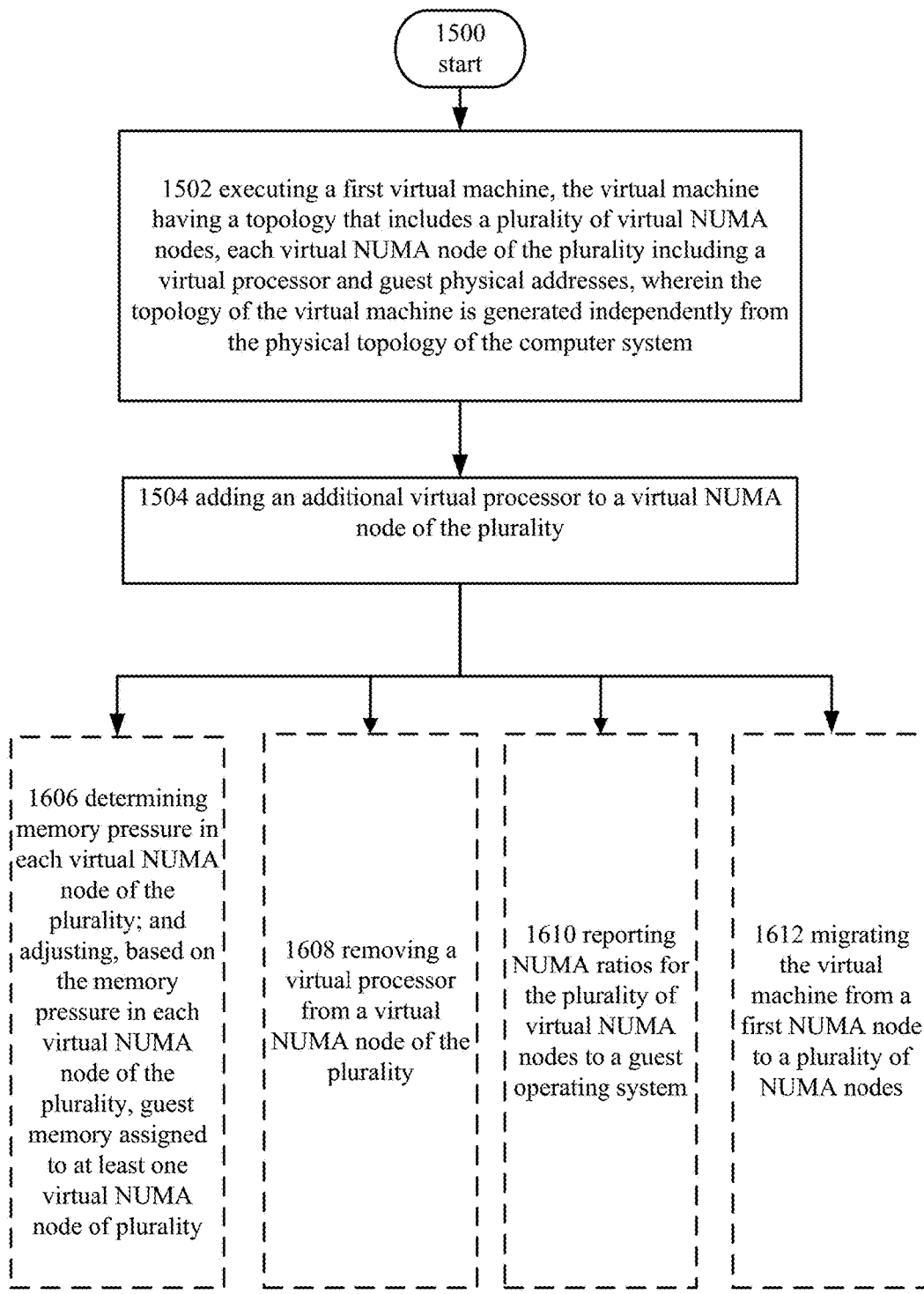
FIG. 16 depicts an alternative embodiment of the operational procedure of FIG. 15.

Turning now to FIG. 16, it depicts an alternative embodiment of the operational procedure depicted by FIG. 15 including additional operations 1606-1612. Operation 1606 shows determining memory pressure in each virtual NUMA node of the plurality; and adjusting, based on the memory pressure in each virtual NUMA node of the plurality, guest memory assigned to at least one virtual NUMA node of plurality. Referring to FIG. 8, memory pressure for each virtual NUMA node 606 and 608 can be obtained, e.g., generated and/or received. Memory pressure information can identify how performance of the guest is affected by the amount of memory that is available to each virtual NUMA node. DMVSCs 804 and 806 can be configured to receive, for example, physical memory notifications and/or guest operating system paging information from memory manager 808 and use it to compute the memory pressure of each virtual NUMA node 606 and 608.

Continuing with the example, a logical processor 212A for example, can execute instructions indicative of DMVSP 802 and can adjust the amount of guest physical addresses in a virtual NUMA node 606 for example. That is, DMVSP 802 commit or de-commit memory based on the memory pressure that the guest OS is experiencing due to the resources in of the virtual NUMA node 606.

Continuing with the description of FIG. 16, operation 1608 illustrates removing a virtual processor from a virtual NUMA node of the plurality. In an embodiment that includes 1706, hypervisor 202 can be executed by a logical processor and a virtual processor can be removed from the virtual NUMA node 606. For example, the hypervisor 202 can access a hot-remove API of the guest operating system 220 and remove, for example, virtual processor 230B from virtual NUMA node 608.

Turning now to operation 1610, it shows reporting NUMA ratios for the plurality of virtual NUMA nodes to a guest operating system. For example, in an embodiment the hypervisor 202 can generate NUMA ratios for virtual NUMA nodes 606-608 and this information can be reported to the guest operating system 220 of either FIG. 6 or FIG. 7. In an embodiment hypervisor 202 can create a data structure in a virtual machine's firmware table that indicates the NUMA ratio for the virtual NUMA nodes and when the guest operating system 220 boots the guest can read the table and use the information to make scheduling decisions. For example, a guest operating system, or NUMA aware application, may use the NUMA ratios to determine whether or not to use resources from a remote NUMA node. For example, an operating system may have a pending thread that is ready to be executed. The operating system in this example can also be configured to wait a certain amount of time for an ideal processor to become free otherwise it will schedule the thread on a remote processor that has less than a predetermined NUMA ratio. In this case the amount of time the scheduler is willing to wait is dependent upon the NUMA ratio.

Turning now to operation 1612, it shows migrating the virtual machine from a first NUMA node to a plurality of NUMA nodes. For example, in an embodiment hypervisor instructions can be executed by a logical processor and virtual machine 240 can be mapped to a plurality of NUMA nodes 704 and 706. In this example computer system 700 may have been under heavy use, e.g., virtual machine 242 may have been using a majority of the resources, and so virtual machine 242 was migrated off computer 700. In this situation hypervisor 202 can reallocate the resources of the computer system 700 and remap virtual machine 240 to NUMA nodes 704 and 706.

Figure 17:
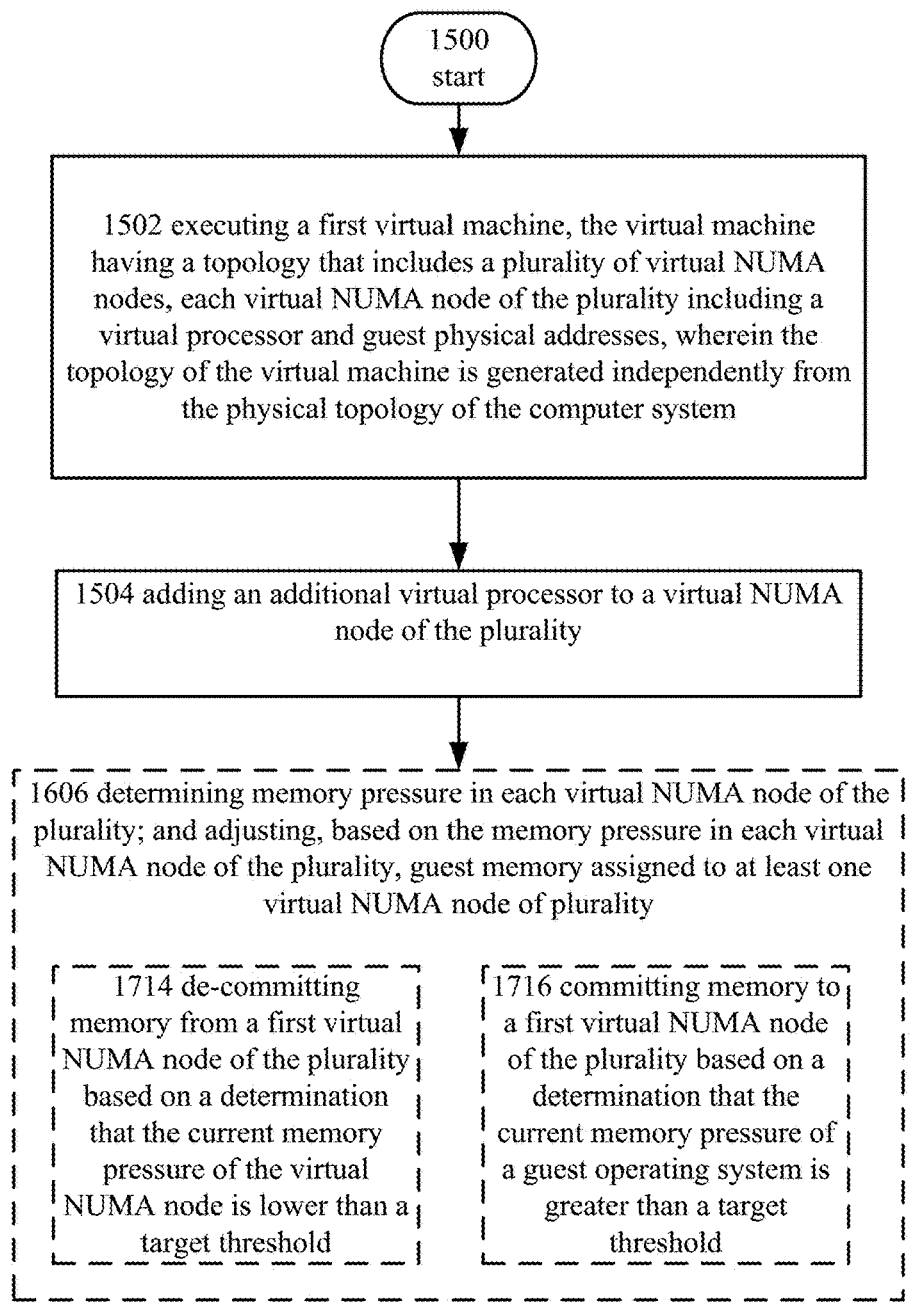
FIG. 17 depicts an alternative embodiment of the operational procedure of FIG. 16.

Turning now to FIG. 17, it depicts an alternative embodiment of the operational procedure of FIG. 16 including operations 1714 and 1716. In an embodiment operation 1606 can include operation 1714 which shows de-committing memory from a first virtual NUMA node of the plurality based on a determination that the current memory pressure of the virtual NUMA node is lower than a target threshold. For example, in an embodiment DMVSP 802 can be configured to de-commit memory from a virtual NUMA node 606 when the memory pressure of the virtual NUMA node 608 is lower than a target threshold. For example, in an embodiment the DMVSP 802 can attempt to free up memory from virtual NUMA node 606 when, for example, there is no memory available in the parent partition that can be committed and the virtual NUMA node 608 is experiencing unacceptable pressure. If memory is de-committed from a virtual NUMA node 606, an asynchronous message can be sent to the DMVSC 804 directing it to de-commit memory. When the DMVSC 804 associated with guest OS 220 responds, it can indicate new memory pressure within the virtual NUMA node 606. In some cases, the memory pressure may be increased in response to the memory removal operation.

Continuing with the description of FIG. 17, operation 1716 shows committing memory to a first virtual NUMA node of the plurality based on a determination that the current memory pressure of a guest operating system is greater than a target threshold. For example, in an embodiment DMVSP 802 can be configured to commit memory to virtual NUMA node 606 when the memory pressure of virtual NUMA node 606 is greater than a target threshold. In this case, if memory is available it can be allocated to the virtual NUMA node 606. That is, the DMVSP 802 can obtain memory pressure information that identifies how performance of the virtual NUMA node 606 is affected by the amount of memory available and add memory to the virtual NUMA node 606. In a specific example the memory pressure information can be a value. In this example the DMVSP 802 can compare the current memory pressure value to a table of information that indicates a minimum value for the virtual NUMA node 606 and adjust the memory until the memory pressure of the virtual NUMA node 606 is equal to the minimum. For example, an administrator may configure a guest operating system that runs a critical application to have a low minimum values for the virtual NUMA nodes 606 and 608.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:
1. A method, comprising:
receiving a request to instantiate a virtual machine;
selecting a virtual non-uniform memory architecture (NUMA) node topology for the virtual machine, the virtual NUMA node topology including a plurality of virtual NUMA nodes;
instantiating the virtual machine on a computer system, the virtual machine including the plurality of virtual NUMA nodes; and
adjusting an amount of guest memory assigned to a specific virtual NUMA node by a second amount of guest memory, wherein the adjusting comprises exchanging the second amount of guest memory between the specific virtual NUMA node and a second virtual NUMA node of the plurality of virtual NUMA nodes.

2. The method of claim 1, wherein adjusting an amount of guest memory assigned to the specific virtual NUMA node is based at least in part on memory pressure in the second virtual NUMA node.

3. The method of claim 1, further comprising:
sending a message to a guest operating system running on the specific virtual NUMA node, wherein the message indicates that at least one memory block of guest memory has been added to the specific virtual NUMA node.

4. The method of claim 1, further comprising:
associating at least one memory block of guest memory with system memory prior to adding, during runtime execution of the virtual machine, guest memory to the specific virtual NUMA node.

5. The method of claim 1, further comprising:
removing, during runtime execution of the virtual machine, guest memory from the specific virtual NUMA node.

6. The method of claim 5, wherein removing, during runtime execution of the virtual machine, guest memory from the specific virtual NUMA node is based at least in part on memory pressure of the specific virtual NUMA node.

7. The method of claim 5, wherein the removing, during runtime execution of the virtual machine, guest memory from the specific virtual NUMA node, further comprises:
disassociating at least one memory block of guest memory of the specific virtual NUMA node from system memory.

8. A computer system, comprising:
circuitry for receiving a request to instantiate a virtual machine;
circuitry for selecting a virtual non-uniform memory architecture (NUMA) node topology for the virtual machine, the virtual NUMA node topology including a plurality of virtual NUMA nodes;
circuitry for instantiating the virtual machine on a computer system, the virtual machine including the plurality of virtual NUMA nodes; and
circuitry for adjusting an amount of guest memory assigned to a specific virtual NUMA node by a second amount of guest memory, wherein the adjusting comprises exchanging the second amount of guest memory between the specific virtual NUMA node and a second virtual NUMA node of the plurality of virtual NUMA nodes.

9. The computer system of claim 8, wherein the amount of guest memory assigned to the specific virtual NUMA node is based at least in part on memory pressure in the second virtual NUMA node.

10. The computer system of claim 8, further comprising:
circuitry for sending a message to a guest operating system running on the specific virtual NUMA node, wherein the message indicates that at least one memory block of guest memory has been added to the specific virtual NUMA node.

11. The computer system of claim 8, further comprising:
circuitry for associating at least one memory block of guest memory with system memory prior to adding, during runtime execution of the virtual machine, guest memory to the specific NUMA node.

12. The computer system of claim 8, further comprising:
circuitry for removing, during runtime execution of the virtual machine, guest memory from the specific virtual NUMA node.

13. The computer system of claim 12, wherein the removing, during runtime execution of the virtual machine, guest memory from the specific virtual NUMA node is based at least in part on memory pressure of the specific virtual NUMA node.

14. The computer system of claim 12, wherein the circuitry for removing, during runtime execution of the virtual machine, guest memory from the specific virtual NUMA node, further comprises:

circuitry for disassociating at least one memory block of guest memory of the specific virtual NUMA node from system memory.

15. A non-transitory computer readable medium including processor-executable instructions, comprising:
- instructions for receiving a request to instantiate a virtual machine;
- instructions for selecting a virtual non-uniform memory architecture (NUMA) node topology for the virtual machine, the virtual NUMA node topology including a plurality of virtual NUMA nodes;
- instructions for instantiating the virtual machine on a computer system, the virtual machine including the plurality of virtual NUMA nodes; and
- instructions for adjusting an amount of guest memory assigned to a specific virtual NUMA node by a second amount of guest memory, the second amount of guest memory being exchanged between the specific virtual NUMA node and a second virtual NUMA node of the plurality of virtual NUMA nodes.

16. The non-transitory computer readable medium of claim 15, wherein the amount of guest memory assigned to the specific virtual NUMA node is based at least in part on memory pressure in the second virtual NUMA node.

17. The non-transitory computer readable medium of claim 15, further comprising:
- instructions for associating at least one memory block of guest memory with system memory prior to adding, during runtime execution of the virtual machine, guest memory to the specific virtual NUMA node.

18. The non-transitory computer readable medium of claim 15, further comprising:
- instructions for removing, during runtime execution of the virtual machine, guest memory from the specific virtual NUMA node.

19. The non-transitory computer readable medium of claim 18, wherein the removing, during runtime execution of the virtual machine, guest memory from the specific virtual NUMA node is based at least in part on memory pressure of the specific virtual NUMA node.

20. The non-transitory computer readable medium of claim 18, wherein the instructions for removing, during runtime execution of the virtual machine, guest memory from the specific virtual NUMA node, further comprise:
- instructions for disassociating at least one memory block of guest memory of the specific virtual NUMA node from system memory.

* * * * *